US012062511B2

(12) United States Patent
Yoo et al.

(10) Patent No.: US 12,062,511 B2
(45) Date of Patent: Aug. 13, 2024

(54) ARC PATH FORMATION UNIT AND DIRECT CURRENT RELAY INCLUDING SAME

(71) Applicant: LS ELECTRIC CO., LTD., Anyang-si (KR)

(72) Inventors: Jung Woo Yoo, Anyang-si (KR); Han Mi Ru Kim, Anyang-si (KR); Young Ho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 18/013,814

(22) PCT Filed: May 25, 2021

(86) PCT No.: PCT/KR2021/006518
§ 371 (c)(1),
(2) Date: Dec. 29, 2022

(87) PCT Pub. No.: WO2022/005021
PCT Pub. Date: Jan. 6, 2022

(65) Prior Publication Data

US 2023/0298839 A1 Sep. 21, 2023

(30) Foreign Application Priority Data

Jun. 29, 2020 (KR) ........................ 10-2020-0079616

(51) Int. Cl.
*H01H 50/38* (2006.01)
*H01H 50/02* (2006.01)
*H01H 50/54* (2006.01)

(52) U.S. Cl.
CPC ............ *H01H 50/38* (2013.01); *H01H 50/02* (2013.01); *H01H 50/54* (2013.01)

(58) Field of Classification Search
None
See application file for complete search history.

(56) References Cited

U.S. PATENT DOCUMENTS

2011/0240603 A1* 10/2011 Hoffmann .............. H01H 9/443 218/26
2012/0175345 A1* 7/2012 Tachikawa ............ H01H 9/443 218/26

(Continued)

FOREIGN PATENT DOCUMENTS

JP 2012146634 A 8/2012
JP 2014086206 A 5/2014

(Continued)

OTHER PUBLICATIONS

Office Action for related Korean Application No. 10-2020-0079616; action dated Mar. 8, 2022; (4 pages).

(Continued)

*Primary Examiner* — Bernard Rojas
(74) *Attorney, Agent, or Firm* — K&L Gates LLP

(57) ABSTRACT

An arc path formation unit and a direct current relay are disclosed. The arc path formation unit, according to various embodiments of the present disclosure, includes a Halbach array provided in at least one of the forward and backward directions. The Halbach array forms a magnetic field within an arc chamber by itself or along with another magnetic body. An electromagnetic force may be generated for inducing an arc that is generated by a formed magnetic field and current flowing through the direct current relay. The electromagnetic force is generated in a direction away from each fixed contact. Accordingly, the generated arc can be extinguished and discharged effectively.

17 Claims, 8 Drawing Sheets

(56) References Cited

U.S. PATENT DOCUMENTS

| | | | | |
|---|---|---|---|---|
| 2012/0181860 | A1* | 7/2012 | Hsu | H01H 9/443 218/24 |
| 2015/0042424 | A1 | 2/2015 | Maruyama et al. | |
| 2016/0133404 | A1* | 5/2016 | Zhong | H01H 50/546 335/201 |

FOREIGN PATENT DOCUMENTS

| | | | |
|---|---|---|---|
| JP | 2019036431 | A | 3/2019 |
| KR | 102009875 | | 8/2019 |

OTHER PUBLICATIONS

International Search Report for related International Application No. PCT/KR2021/006518; action dated Jan. 6, 2022; (5 pages).
Written Opinion for related International Application No. PCT/KR2021/006518; action dated Jan. 6, 2022; (10 pages).

* cited by examiner (a)

(b)

ARC PATH FORMATION UNIT AND DIRECT CURRENT RELAY INCLUDING SAME

CROSS-REFERENCE TO RELATED APPLICATION

This application is a National Stage of International Application No. PCT/KR2021/006518 filed on May 25, 2021 claims priority to and the benefit of Korean Patent Application No. 10-2020-0079616, filed on Jun. 29, 2020, the disclosures of which are incorporated herein by reference in their entirety.

FIELD

The present disclosure relates to an arc path formation unit and a direct current relay including the same, and more particularly, to an arc path formation unit having a structure capable of effectively inducing a generated arc toward the outside and a direct current relay including the same.

BACKGROUND

A direct current relay is a device that transmits a mechanical driving signal or a current signal using the principle of an electromagnet. The direct current relay is also called a magnetic switch and is generally classified as an electrical circuit switching device.

The direct current relay includes a fixed contact and a movable contact. The fixed contact is electrically connected to an external power supply and a load. The fixed contact and the movable contact may be brought into contact with or separated from each other.

By the contact and separation between the fixed contact and the movable contact, a current flow through the direct current relay is allowed or blocked. Such a movement is made by a driving unit that applies a driving force to the movable contact.

When the fixed contact and the movable contact are separated from each other, an arc is generated between the fixed contact and the movable contact. The arc is a flow of high-pressure and high-temperature current. Accordingly, the generated arc must be quickly discharged from the direct current relay through a predetermined path.

An arc discharge path is formed by magnets provided in the direct current relay. The magnets form magnetic fields in a space in which the fixed contact and the movable contact are in contact with each other. The arc discharge path may be formed by the formed magnetic field and an electromagnetic force generated by a flow of current.

Referring to FIG. 1, a space in which fixed contacts 1100 and a movable contact 1200 provided in a direct current relay 1000 according to the related art are in contact with each other is illustrated. As described above, permanent magnets 1300 are provided in the space.

The permanent magnets 1300 include a first permanent magnet 1310 disposed at an upper side and a second permanent magnet 1320 disposed at a lower side.

The first permanent magnet 1310 is provided in plural, and each surface facing the second permanent magnet 1320 is magnetized to a different polarity. A lower side of the first permanent magnet 1310 located on a left side of FIG. 1 is magnetized to an N pole, and a lower side of the first permanent magnet 1310 located on a right side of FIG. 1 is magnetized to an S pole.

In addition, the second permanent magnet 1320 is also provided in plural, and each surface facing the first permanent magnet 1310 is magnetized to a different polarity. An upper side of the second permanent magnet 1320 located on the left side of FIG. 1 is magnetized to an S pole, and an upper side of the second permanent magnet 1320 located on the right side of FIG. 1 is magnetized to an N pole.

FIG. 1A illustrates a state in which current flows in through the left fixed contact 1100 and flows out through the right fixed contact 1100. According to the Fleming's left-hand rule, an electromagnetic force is formed as indicated by hatched arrows.

Specifically, in the case of the fixed contact 1100 located on the left side, the electromagnetic force is formed toward the outside. Accordingly, the arc generated at the corresponding location can be discharged to the outside.

However, in the case of the fixed contact 1100 located on the right side, the electromagnetic force is formed to the inside, that is, toward a central portion of the movable contact 1200. Accordingly, the arc generated at the corresponding location cannot be immediately discharged to the outside.

In addition, FIG. 1B illustrates a state in which current flows in through the right fixed contact 1100 and flows out through the left fixed contact 1100. According to the Fleming's left-hand rule, an electromagnetic force is formed as indicated by hatched arrows.

Specifically, in the case of the fixed contact 1100 located on the right side, the electromagnetic force is formed toward the outside. Accordingly, the arc generated at the corresponding location can be discharged to the outside.

However, in the case of the fixed contact 1100 located on the left side, the electromagnetic force is formed to the inside, that is, toward the central portion of the movable contact 1200. Accordingly, the arc generated at the corresponding location cannot be immediately discharged to the outside.

Several members for driving the movable contact 1200 to be moved in a vertical direction are provided in a central part of the direct current relay 1000, that is, in a space between the fixed contacts 1100. As an example, a shaft, a spring member inserted through the shaft, and the like are provided at the location.

Accordingly, when the arc generated as illustrated in FIG. 1 is moved toward the central part, and the arc moved to the central part cannot be immediately moved to the outside, there is a risk that the several members provided at the location may be damaged by energy of the arc.

In addition, as illustrated in FIG. 1, a direction of the electromagnetic force formed inside the direct current relay 1000 according to the related art depends on a direction of current flowing through the fixed contacts 1100. That is, the location of the electromagnetic force, which is formed in a direction toward the inside, among the electromagnetic forces generated in each fixed contact 1100 is different depending on the direction of the current.

That is, a user must consider the direction of the current whenever using the direct current relay. This may cause inconvenience to the use of the direct current relay. In addition, regardless of the user's intention, a situation in which a direction of current applied to the direct current relay is changed due to an inexperienced operation or the like cannot be excluded.

In this case, the members provided in the central part of the direct current relay may be damaged by the generated arc. Accordingly, there is a concern of reducing the durable lifetime of the direct current relay and also generating safety accidents.

Korean Registration Application No. 10-1696952 discloses a direct current relay. Specifically, a direct current relay having a structure capable of preventing movement of a movable contact by using a plurality of permanent magnets is disclosed.

However, the direct current relay having the above structure can prevent the movement of the movable contact by using the plurality of permanent magnets, but there is a limitation in that any method for controlling a direction of an arc discharge path is not considered.

Korean Registration Application No. 10-1216824 discloses a direct current relay. Specifically, a direct current relay having a structure capable of preventing arbitrary separation between a movable contact and a fixed contact using a damping magnet is disclosed.

However, the direct current relay having the above structure merely proposes a method for maintaining a contact state between the movable contact and the fixed contact. That is, there is a limitation in that a method for forming a discharge path for an arc generated when the movable contact and the fixed contact are separated from each other is not introduced.

(Patent Document 1) Korean Registration Application No. 10-1696952 (Jan. 16, 2017)

(Patent Document 2) Korean Registration Application No. 10-1216824 (Dec. 28, 2012)

SUMMARY

The present disclosure is directed to providing an arc path formation unit having a structure capable of solving the above-described problems and a direct current relay including the same.

First, the present disclosure is directed to providing an arc path formation unit having a structure capable of quickly extinguishing and discharging an arc generated as flowing current is interrupted, and a direct current relay including the same.

In addition, the present disclosure is directed to providing an arc path formation unit having a structure capable of increasing the magnitude of force for inducing a generated arc, and a direct current relay including the same.

In addition, the present disclosure is directed to providing an arc path formation unit having a structure capable of preventing damage to a component for electric connection due to a generated arc, and a direct current relay including the same.

In addition, the present disclosure is directed to providing an arc path formation unit having a structure capable of allowing arcs generated at a plurality of locations to propagate without meeting each other, and a direct current relay including the same.

In addition, the present disclosure is directed to providing an arc path formation unit having a structure capable of achieving the above-described objects without an excessive design change, and a direct current relay including the same.

In order to achieve those objects, one embodiment of the present disclosure provides an arc path formation unit including a magnet frame having a space part, in which a fixed contactor and a movable contactor are accommodated, formed therein, a Halbach array located in the space part of the magnet frame and configured to form a magnetic field in the space part, wherein a length of the space part in one direction is formed to be greater than a length thereof in the other direction, the magnet frame includes a first surface and a second surface which extend in the one direction, are disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, and the Halbach array includes a plurality of blocks disposed side by side in the one direction and formed of a magnetic material, and is located adjacent to one or more surfaces of the first surface and the second surface.

In addition, the Halbach array of the arc path formation unit may include a first Halbach array located adjacent to any one surface of the first surface and the second surface, and a second Halbach array located adjacent to the other surface of the first surface and the second surface and disposed to face the first Halbach array with the space part therebetween.

In addition, a surface of the first Halbach array of the arc path formation unit facing the second Halbach array and a surface of the second Halbach array facing the first Halbach array may be magnetized to different polarities.

In addition, the first Halbach array of the arc path formation unit may include a first block located to be biased to any one surface of the third surface and the fourth surface, a third block located to be biased to the other surface of the third surface and the fourth surface, and a second block located between the first block and the third block, and the second Halbach array may include a first block located to be biased to the any one surface of the third surface and the fourth surface, a third block located to be biased to the other surface of the third surface and the fourth surface, and a second block located between the first block and the third block.

In addition, in the first Halbach array of the arc path formation unit, a surface of the first block facing the second block, a surface of the third block facing the second block, and a surface of the second block facing the second Halbach array may be magnetized to the same polarity, and in the second Halbach array, a surface of the first block facing the second block, a surface of the third block facing the second block, and a surface of the second block facing the first Halbach array may be magnetized to a polarity different from the polarity.

In addition, the Halbach array may include a first Halbach array located adjacent to any one surface of the first surface and the second surface, and located to be biased to any one surface of the third surface and the fourth surface, and a second Halbach array located adjacent to the any one surface of the first surface and the second surface, and located to be biased to the other surface of the third surface and the fourth surface, and a magnet part, which is provided separately from the Halbach array, disposed to face each of the first and second Halbach arrays with the space part therebetween, and configured to form the magnetic field in the space part, may be provided on the other surface of the first surface and the second surface.

In addition, a surface of the first Halbach array of the arc path formation unit facing the magnet part and a surface of the second Halbach array facing the magnet part may be magnetized to the same polarity, and a surface of the magnet part facing the first Halbach array and the second Halbach array may be magnetized to a polarity different from the polarity.

In addition, the first Halbach array of the arc path formation unit may include a first block located to be biased to the any one surface of the third surface and the fourth surface, a third block located to be biased to the other surface of the third surface and the fourth surface, and a second block located between the first block and the third block, and the second Halbach array may include a first block located to be biased to the any one surface of the third surface and the fourth surface, a third block located to be biased to the other surface of the third surface and the fourth surface, and a second block located between the first block and the third block.

In addition, in the first Halbach array of the arc path formation unit, a surface of the first block facing the second block, a surface of the third block facing the second block, and a surface of the second block facing the magnet part may be magnetized to the same polarity, in the second Halbach array, a surface of the first block facing the second block, a surface of the third block facing the second block, and a surface of the second block facing the magnet part may be magnetized to the same polarity, and in the magnet part, a surface of the magnet part facing the first Halbach array and the second Halbach array may be magnetized to a polarity different from the polarity.

In addition, the Halbach array of the arc path formation unit may include a first Halbach array located adjacent to any one surface of the first surface and the second surface, and located to be biased to any one surface of the third surface and the fourth surface, a second Halbach array located adjacent to the any one surface of the first surface and the second surface, and located to be biased to the other surface of the third surface and the fourth surface, a third Halbach array located adjacent to the other surface of the first surface and the second surface, located to be biased to the any one surface of the third surface and the fourth surface, and disposed to face the first Halbach array with the space part therebetween, and a fourth Halbach array located adjacent to the other surface of the first surface and the second surface, located to be biased to the other surface of the third surface and the fourth surface, and disposed to face the second Halbach array with the space part therebetween.

In addition, a surface of the first Halbach array of the arc path formation unit facing the third Halbach array and a surface of the second Halbach array facing the fourth Halbach array may be magnetized to the same polarity, and a surface of the third Halbach array facing the first Halbach array and a surface of the fourth Halbach array facing the second Halbach array may be magnetized to a polarity different from the polarity.

In addition, the first Halbach array of the arc path formation unit may include a first block located to be biased to the any one surface of the third surface and the fourth surface, a third block located to be biased to the other surface of the third surface and the fourth surface, and a second block located between the first block and the third block, the second Halbach array may include a first block located to be biased to the any one surface of the third surface and the fourth surface, a third block located to be biased to the other surface of the third surface and the fourth surface, and a second block located between the first block and the third block, the third Halbach array may include a first block located to be biased to the any one surface of the third surface and the fourth surface, a third block located to be biased to the other surface of the third surface and the fourth surface, and a second block located between the first block and the third block, and the fourth Halbach array may include a first block located to be biased to the any one surface of the third surface and the fourth surface, a third block located to be biased to the other surface of the third surface and the fourth surface, and a second block located between the first block and the third block.

In addition, in each of the first Halbach array and the second Halbach array of the arc path formation unit, a surface of the first block facing the second block, a surface of the third block facing the second block, and a surface of the second block facing the third Halbach array and the fourth Halbach array may be magnetized to the same polarity, and in each of the third Halbach array and the fourth Halbach array, a surface of the first block facing the second block, a surface of the third block facing the second block, and a surface of the second block facing the first Halbach array and the second Halbach array may be magnetized to a polarity different from the polarity.

In addition, another embodiment of the present disclosure provides a direct current relay including a plurality of fixed contactors located to be spaced apart from each other in one direction, a movable contactor configured to be brought into contact with or separated from the fixed contactors, a magnet frame having a space part, in which the fixed contactors and the movable contactor are accommodated, formed therein, and a Halbach array located in the space part of the magnet frame and configured to form a magnetic field in the space part, wherein a length of the space part in the one direction is formed to be greater than a length thereof in the other direction, the magnet frame includes a first surface and a second surface which extend in the one direction, are disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, and the Halbach array includes a plurality of blocks disposed side by side in the one direction and formed of a magnetic material, and is located adjacent to one or more surfaces of the first surface and the second surface.

In addition, the Halbach array of the direct current relay may include a first Halbach array located adjacent to any one surface of the first surface and the second surface, and a second Halbach array located adjacent to the other surface of the first surface and the second surface and disposed to face the first Halbach array with the space part therebetween, wherein a surface of the first Halbach array facing the second Halbach array and a surface of the second Halbach array facing the first Halbach array may be magnetized to different polarities.

In addition the Halbach array of the direct current relay may include a first Halbach array located adjacent to any one surface of the first surface and the second surface, and located to be biased to any one surface of the third surface and the fourth surface, and a second Halbach array located adjacent to the any one surface of the first surface and the second surface, and located to be biased to the other surface of the third surface and the fourth surface, and a magnet part, which is provided separately from the Halbach array, disposed to face each of the first and second Halbach arrays with the space part therebetween, and configured to form the magnetic field in the space part, may be provided on the other surface of the first surface and the second surface, wherein a surface of the first Halbach array facing the magnet part and a surface of the second Halbach array facing the magnet part may be magnetized to the same polarity, and a surface of the magnet part facing the first Halbach array and the second Halbach array may be magnetized to a polarity different from the polarity.

In addition, the Halbach array of the direct current relay may include a first Halbach array located adjacent to any one surface of the first surface and the second surface, and located to be biased to any one surface of the third surface and the fourth surface, a second Halbach array located adjacent to the any one surface of the first surface and the second surface, and located to be biased to the other surface of the third surface and the fourth surface, a third Halbach array located adjacent to the other surface of the first surface and the second surface, located to be biased to the any one surface of the third surface and the fourth surface, and disposed to face the first Halbach array with the space part therebetween, and a fourth Halbach array located adjacent to the other surface of the first surface and the second surface, located to be biased to the other surface of the third surface and the fourth surface, and disposed to face the second Halbach array with the space part therebetween, wherein a surface of the first Halbach array facing the third Halbach array and a surface of the second Halbach array facing the fourth Halbach array may be magnetized to the same polarity, and a surface of the third Halbach array facing the first Halbach array and a surface of the fourth Halbach array facing the second Halbach array may be magnetized to a polarity different from the polarity.

According to embodiments of the present disclosure, the following effects can be achieved.

First, an arc path formation unit includes a Halbach array and a magnet part. Each of the Halbach array and the magnet part forms a magnetic field inside the arc path formation unit. The formed magnetic field forms an electromagnetic force together with current flowing through a fixed contactor and a movable contactor accommodated in the arc path formation unit.

In this case, a generated arc is formed in a direction away from each fixed contactor. An arc generated as the fixed contactor and the movable contactor are separated from each other can be induced by the electromagnetic force.

Accordingly, the generated arc can be quickly extinguished and discharged to the outside of the arc path formation unit and a direct current relay.

In addition, the arc path formation unit includes a Halbach array. The Halbach array includes a plurality of magnetic materials disposed side by side in one direction. Each of the plurality of magnetic materials can enhance the strength of a magnetic field on any one side of both sides thereof in the other direction different from the one direction.

At this point, the Halbach array is disposed such that the any one side, that is, the side in the direction in which the strength of the magnetic field is enhanced, faces a space part of the arc path formation unit. That is, due to the Halbach array, the strength of the magnetic field formed in the space part can be enhanced.

Accordingly, the strength of the electromagnetic force, which depends on the strength of the magnetic field, can also be enhanced. As a result, the strength of the electromagnetic force inducing the generated arc can be enhanced so that the generated arc can be effectively extinguished and discharged.

In addition, directions of the magnetic fields formed by the Halbach array and the magnet part and a direction of the electromagnetic force formed by the current flowing through the fixed contactor and the movable contactor are formed to be away from a central part.

Furthermore, as described above, since the strength of each of the magnetic field and the electromagnetic force is enhanced by the Halbach array and the magnet part, the generated arc can be extinguished and moved quickly in a direction away from the central part.

Accordingly, it is possible to prevent damage to various components provided in the vicinity of the central part for the operation of the direct current relay.

In addition, in various embodiments, a plurality of fixed contactors can be provided. The Halbach array or the magnet parts provided in the arc path formation unit forms magnetic fields in different directions in the vicinity of each fixed contactor. Thus, paths of the arcs generated in the vicinity of each fixed contactor proceed in different directions.

Accordingly, the arcs generated in the vicinity of each fixed contactor do not meet each other. Thus, a malfunction or a safety accident that may occur due to a collision of arcs generated at different locations can be prevented.

In addition, in order to achieve the above-described objects and effects, the arc path formation unit includes a Halbach array and a magnet part provided in a space part. Each of the Halbach array and the magnet part is located on an inner side of each surface of a magnet frame surrounding the space part. That is, a separate design change for arranging the Halbach array and the magnet part outside the space part is not required.

Accordingly, without an excessive design change, the arc path formation unit according to various embodiments of the present disclosure can be provided in the direct current relay. Accordingly, time and costs for applying the arc path formation unit according to various embodiments of the present disclosure can be reduced.

DETAILED DESCRIPTION

Figure 1:
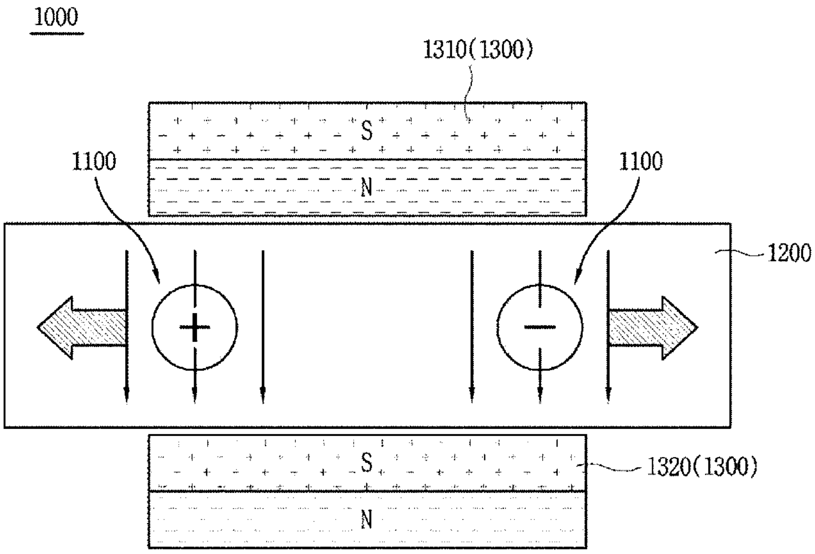
FIG. 1 is a conceptual view illustrating a direct current relay according to the related art.
Figure 1:
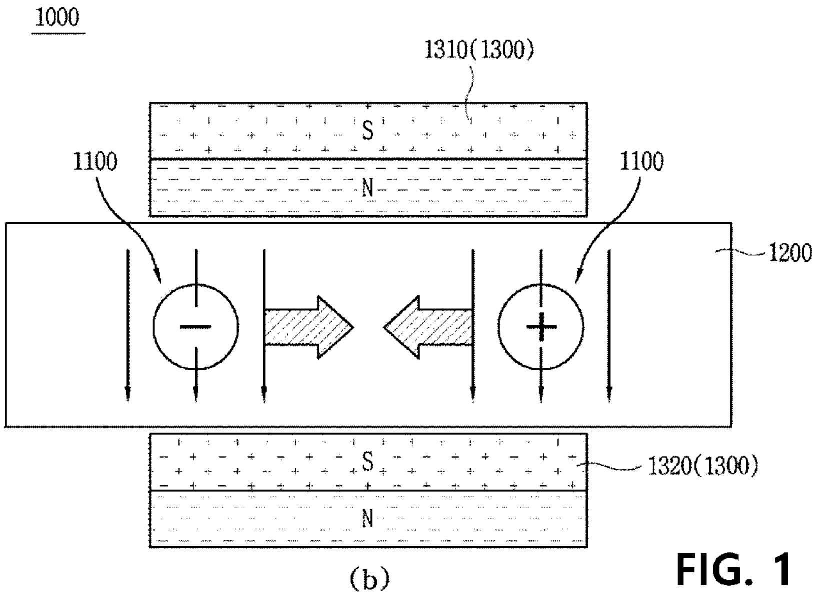

Hereinafter, a direct current relay 1 and arc path formation units 100, 200, and 300 according to embodiments of the present disclosure will be described with reference to the accompanying drawings.

In the following description, descriptions of some components may be omitted to clarify the features of the present disclosure.

1. Definition of Terms

It will be understood that when a component is referred to as being "connected" or "coupled" to another component, it can be directly connected or coupled to the another component or intervening components may be present.

In contrast, when a component is referred to as being "directly connected" or "directly coupled" to another component, there are no intervening components present.

A singular representation used herein includes a plural representation unless it represents a definitely different meaning from the context.

The term "magnetize" used in the following description means a phenomenon in which an object exhibits magnetism in a magnetic field.

The term "polarities" used in the following description means different properties belonging to an anode and a cathode. In one embodiment, the polarities may be classified into an N pole or an S pole.

The term "electric connection" used in the following description means a state in which two or more members are electrically connected.

The term "arc path A.P" used in the following description means a path through which a generated arc is moved or extinguished.

The symbol "⊙" shown in the following drawings means that current flows in a direction from a movable contactor 43 toward a fixed contactor 22 (i.e., in an upward direction), that is, in a direction in which the current flows from the ground.

The symbol "⊗" shown in the following drawings means that current flows in a direction from the fixed contactor 22 toward the movable contactor 43 (i.e., in a downward direction), that is, a direction in which the current flows into the ground.

The term "Halbach array" used in the following description means an assembly of a plurality of magnetic materials that are disposed in parallel to form columns or rows.

The plurality of magnetic materials constituting the Halbach array may be disposed according to a predetermined rule. A magnetic field may be formed by the magnetic material itself, or magnetic fields may also be formed by between the plurality of magnetic materials.

The Halbach array includes two relatively long surfaces and two relatively short surfaces. Among the magnetic fields formed by the magnetic materials constituting the Halbach array, the magnetic field on an outer side of any one surface of the two long surfaces may be formed with a higher strength.

In the following description, descriptions will be made on the assumption that, among the magnetic fields formed by the Halbach array, the magnetic field in a direction toward a space part 115, 215, or 315 is formed with a higher strength.

The term "magnet part" used in the following description means any type of object that is formed of a magnetic material and capable of forming a magnetic field. In one embodiment, the magnet part may be provided as a permanent magnet, an electromagnet, or the like. It will be understood that the magnet part is different from the magnetic material forming the Halbach array, that is, a magnetic material provided separately from the Halbach array.

The magnet part may form a magnetic field by itself or together with another magnetic material.

The magnet part may extend in one direction. Both end portions of the magnet part in the one direction may be magnetized to different polarities (i.e., the magnet part has different polarities in a longitudinal direction). In addition, both side surfaces of the magnet part in the other direction different from the one direction may be magnetized to different polarities (i.e., the magnet part has different polarities in a width direction).

The magnetic field formed by each of the arc path formation units 100, 200, and 300 according to the embodiments of the present disclosure is illustrated as a one-dot chain line in each drawing.

Figure 2:
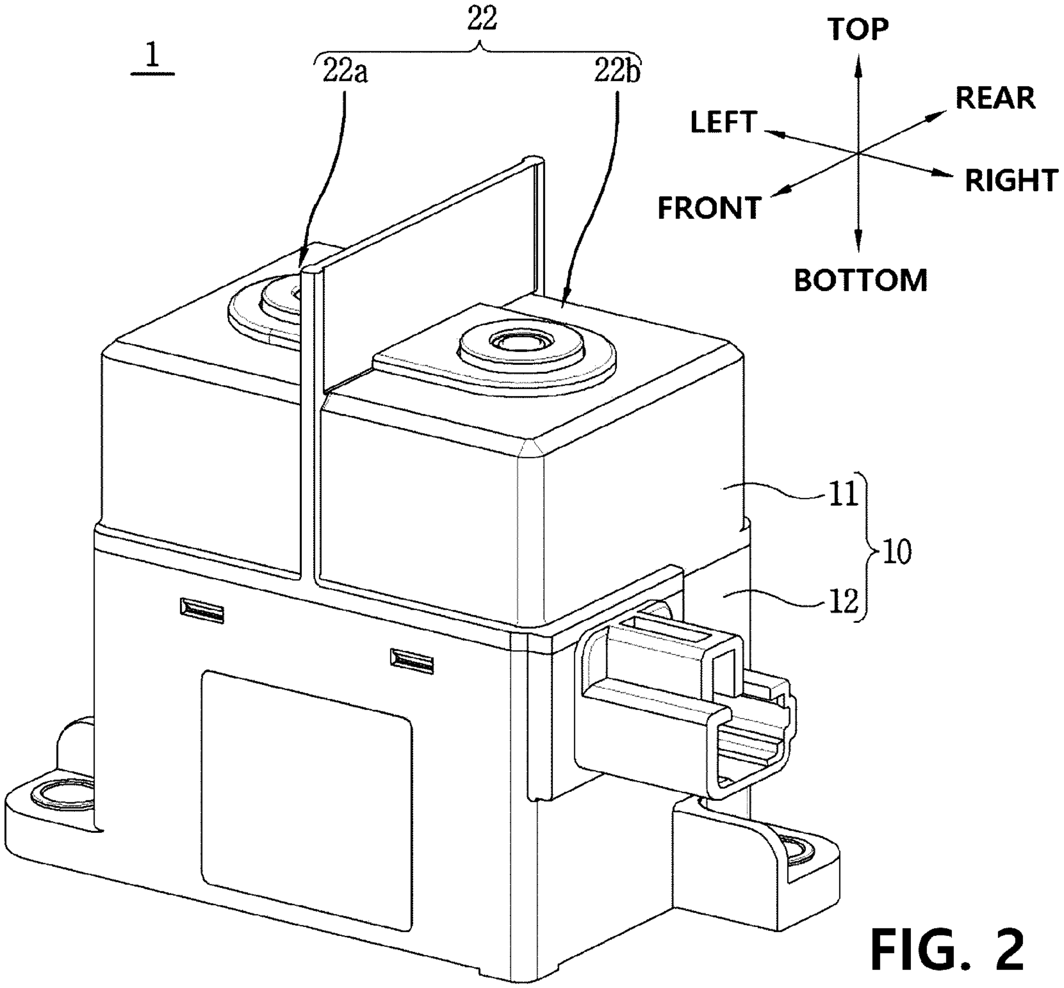
FIG. 2 is a perspective view illustrating a direct current relay according to an embodiment of the present disclosure.

The terms "left side," "right side," "upper side," "lower side," "front side," and "rear side" used in the following description will be understood based on a coordinate system illustrated in FIG. 2.

Figure 3:
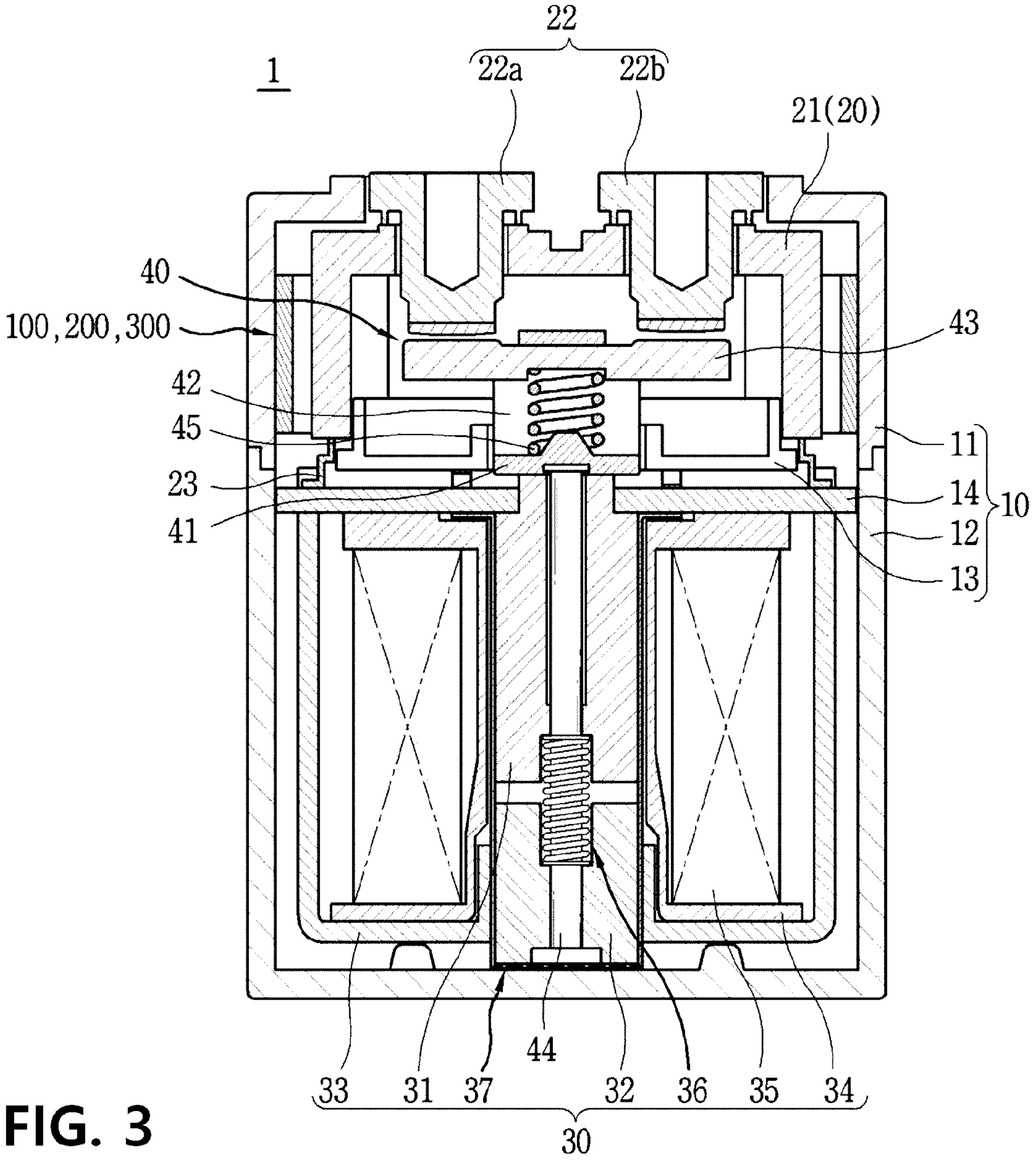
FIG. 3 is a cross-sectional view illustrating a configuration of the direct current relay of FIG. 2.
Figure 4:
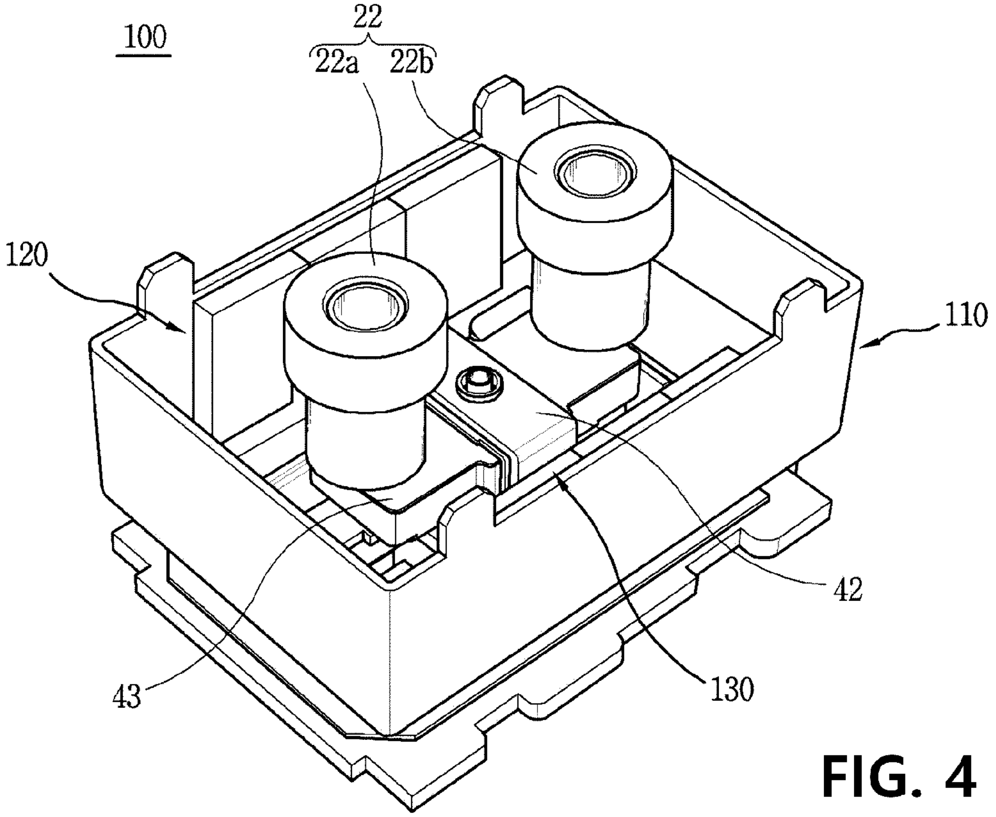
FIG. 4 is an opened perspective view illustrating an arc path formation unit provided in the direct current relay of FIG. 2.

2. Description of Configuration of Direct Current Relay 1 According to Embodiment of Present Disclosure Referring to FIGS. 2 to 4, a direct current relay 1 according to the embodiment of the present disclosure includes a frame part 10, an opening/closing part 20, a core part 30, and a movable contactor part 40.

In addition, referring to FIGS. 5 to 8, the direct current relay 1 according to the embodiment of the present disclosure includes an arc path formation unit 100, 200, or 300.

Each of the arc path formation units 100, 200, and 300 may form a discharge path of a generated arc.

Hereinafter, each configuration of the direct current relay 1 according to the embodiment of the present disclosure will be described with reference to the accompanying drawings, and the arc path formation units 100, 200, and 300 will be described as separate clauses.

The description will be made on the assumption that the arc path formation units 100, 200, and 300 according to various embodiments described below are each provided in the direct current relay 1.

However, it will be understood that the arc path formation units 100, 200, and 300 are applicable to a device in a form that can be electrically connected to and disconnected from the outside by the contact and separation between a fixed contact and a movable contact, such as a magnetic contactor, a magnetic switch, or the like.

(1) Description of Frame Part 10

The frame part 10 forms an outer side of the direct current relay 1. A predetermined space is formed in the frame part 10. Various devices for the direct current relay 1 to perform functions for applying or cutting off current transmitted from the outside may be accommodated in the space.

That is, the frame part 10 serves as a kind of housing.

The frame part 10 may be formed of an insulating material such as synthetic resin. This is for preventing an arbitrary electrical connection between the inside and outside of the frame part 10.

The frame part 10 includes an upper frame 11, a lower frame 12, an insulating plate 13, and a supporting plate 14.

The upper frame 11 forms an upper side of the frame part 10. A predetermined space is formed inside the upper frame 11.

The opening/closing part 20 and the movable contactor part 40 may be accommodated in an inner space of the upper frame 11. The arc path formation units 100, 200, and 300 may also be accommodated in the inner space of the upper frame 11.

The upper frame 11 may be coupled to the lower frame 12. The insulating plate 13 and the supporting plate 14 may be provided in a space between the upper frame 11 and the lower frame 12.

The fixed contactor 22 of the opening/closing part 20 is located on one side of the upper frame 11, e.g., on an upper side of the upper frame 11 in the illustrated embodiment. The fixed contactor 22 may be partially exposed to the upper side of the upper frame 11 to be electrically connected to an external power supply or a load.

To this end, a through hole through which the fixed contactor 22 is coupled may be formed at the upper side of the upper frame 11.

The lower frame 12 forms a lower side of the frame part 10. A predetermined space is formed inside the lower frame 12. The core part 30 may be accommodated in the inner space of the lower frame 12.

The lower frame 12 may be coupled to the upper frame 11. The insulating plate 13 and the supporting plate 14 may be provided in the space between the lower frame 12 and the upper frame 11.

The insulating plate 13 and the supporting plate 14 electrically and physically isolate the inner space of the upper frame 11 and the inner space of the lower frame 12 from each other.

The insulating plate 13 is located between the upper frame 11 and the lower frame 12. The insulating plate 13 allows the upper frame 11 and the lower frame 12 to be electrically separated from each other. To this end, the insulating plate 13 may be formed of an insulating material such as synthetic resin.

Arbitrary electrical connection between the opening/closing part 20, the movable contactor part 40, and the arc path formation unit 100, 200, or 300 that are accommodated in the upper frame 11 and the core part 30 accommodated in the lower frame 12 can be prevented by the insulating plate 13.

A through hole (not shown) is formed in a central part of the insulating plate 13. A shaft 44 of the movable contactor part 40 is coupled through the through hole (not shown) to be movable in a vertical direction.

The supporting plate 14 is located on a lower side of the insulating plate 13. The insulating plate 13 may be supported by the supporting plate 14.

The supporting plate 14 is located between the upper frame 11 and the lower frame 12.

The supporting plate 14 may allow the upper frame 11 and the lower frame 12 to be physically separated from each other. In addition, the supporting plate 14 supports the insulating plate 13.

The supporting plate 14 may be formed of a magnetic material. Accordingly, the supporting plate 14 may form a magnetic circuit together with a yoke 33 of the core part 30. A driving force allowing a movable core 32 of the core part 30 to move toward a fixed core 31 may be formed by the magnetic circuit.

A through hole (not shown) is formed in a central part of the supporting plate 14. The shaft 44 is coupled through the through hole (not shown) to be movable in the vertical direction.

Accordingly, when the movable core 32 is moved in a direction toward or away from the fixed core 31, the shaft 44 and the movable contactor 43 connected to the shaft 44 may also be moved in the same direction.

(2) Description of Opening/Closing Part 20

The opening/closing part 20 may allow or block the flow of current according to an operation of the core part 30. Specifically, the opening/closing part 20 may allow or block the flow of current as the fixed contactor 22 and the movable contactor 43 are brought into contact with or separated from each other.

The opening/closing part 20 is accommodated in the inner space of the upper frame 11. The opening/closing part 20 may be electrically and physically separated from the core part 30 by the insulating plate 13 and the supporting plate 14.

The opening/closing part 20 includes an arc chamber 21, the fixed contactor 22, and a sealing member 23.

In addition, the arc path formation unit 100, 200, or 300 may be provided outside the arc chamber 21. The arc path formation unit 100, 200, or 300 may form a magnetic field for forming an arc path A.P of an arc generated inside the arc chamber 21. A detailed description thereof will be given below.

The arc chamber 21 extinguishes the arc at an inner space thereof, wherein the arc is generated as the fixed contactor 22 and the movable contactor 43 are separated from each other. Accordingly, the arc chamber 21 may also be referred to as an "arc extinguishing part."

The arc chamber 21 sealingly accommodates the fixed contactor 22 and the movable contactor 43. That is, the fixed contactor 22 and the movable contactor 43 are accommodated in the arc chamber 21. Accordingly, the arc generated as the fixed contactor 22 and the movable contactor 43 are separated from each other does not arbitrarily leak to the outside.

An extinguishing gas may be filled in the arc chamber 21. The extinguishing gas may extinguish the generated arc and the extinguished arc may be discharged to the outside of the direct current relay 1 through a predetermined path. To this end, a communication hole (not shown) may be formed in a wall surrounding the inner space of the arc chamber 21.

The arc chamber 21 may be formed of an insulating material. In addition, the arc chamber 21 may be formed of a material having high pressure resistance and high heat resistance. This is because the generated arc is a flow of electrons of high-temperature and high-pressure. In one embodiment, the arc chamber 21 may be formed of a ceramic material.

A plurality of through holes may be formed in an upper side of the arc chamber 21. The fixed contactor 22 is coupled through each of the through holes.

In the illustrated embodiment, two fixed contactors 22 including a first fixed contactor 22*a* and a second fixed contactor 22*b* are provided. Accordingly, two through holes formed in the upper side of the arc chamber 21 may also be provided.

When the fixed contactors 22 are coupled through the through holes, the through holes are sealed. That is, the fixed contactor 22 is sealingly coupled to the through hole. Accordingly, the generated arc cannot be discharged to the outside through the through hole.

A lower side of the arc chamber 21 may be open. The lower side of the arc chamber 21 may be in contact with the insulating plate 13 and the sealing member 23. That is, the lower side of the arc chamber 21 is sealed by the insulating plate 13 and the sealing member 23.

Accordingly, the arc chamber 21 can be electrically and physically separated from an outer space of the upper frame 11.

The arc extinguished in the arc chamber 21 is discharged to the outside of the direct current relay 1 through the predetermined path. In one embodiment, the extinguished arc may be discharged to the outside of the arc chamber 21 through the communication hole (not shown).

The fixed contactor 22 may be brought into contact with or separated from the movable contactor 43, so that the inside and outside of the direct current relay 1 are electrically connected or disconnected.

Specifically, when the fixed contactor 22 is brought into contact with the movable contactor 43, the inside and outside of the direct current relay 1 may be electrically connected. On the other hand, when the fixed contactor 22 is separated from the movable contactor 43, the inside and outside of the direct current relay 1 may be electrically disconnected.

As the name implies, the fixed contactor 22 does not move. That is, the fixed contactor 22 may be fixedly coupled to the upper frame 11 and the arc chamber 21. Accordingly, the contact and separation between the fixed contactor 22 and the movable contactor 43 can be achieved by the movement of the movable contactor 43.

One end portion of the fixed contactor 22, for example, an upper end portion of the fixed contactor 22 in the illustrated embodiment, is exposed to the outside of the upper frame 11. A power supply and a load may each be electrically connected to the one end portion.

The fixed contactor 22 may be provided in plural. In the illustrated embodiment, a total of two fixed contactors 22 are provided, including the first fixed contactor 22*a* on a left side and the second fixed contactor 22*b* on a right side.

The first fixed contactor 22*a* is located to be biased to one side from a center of the movable contactor 43 in a longitudinal direction, i.e., to a left side in the illustrated embodiment. In addition, the second fixed contactor 22*b* is located to be biased to another side from the center of the movable contactor 43 in the longitudinal direction, i.e., to a right side in the illustrated embodiment.

A power supply may be electrically connected to any one of the first fixed contactor 22*a* and the second fixed contactor 22*b*. In addition, a load may be electrically connected to the other one of the first fixed contactor 22*a* and the second fixed contactor 22*b*.

The direct current relay 1 according to the embodiment of the present disclosure may form the arc path A.P regardless of a direction of the power supply or load connected to the fixed contactor 22. This can be achieved by the arc path formation units 100, 200, and 300, and a detailed description thereof will be described below.

The other end portion of the fixed contactor 22, i.e., a lower end portion of the fixed contactor 22 in the illustrated embodiment extends toward the movable contactor 43.

When the movable contactor 43 is moved in a direction toward the fixed contactor 22, i.e., upward in the illustrated embodiment, the lower end portion of the fixed contactor 22 is brought into contact with the movable contactor 43. Accordingly, the outside and inside of the direct current relay 1 can be electrically connected.

The lower end portion of the fixed contactor 22 may be located inside the arc chamber 21.

When control power is cut off, the movable contactor 43 is separated from the fixed contactor 22 by an elastic force of a return spring 36.

At this point, as the fixed contactor 22 and the movable contactor 43 are separated from each other, an arc is generated between the fixed contactor 22 and the movable contactor 43. The generated arc may be extinguished by the extinguishing gas inside the arc chamber 21, and may be discharged to the outside along a path formed by the arc path formation unit 100, 200, or 300.

The sealing member 23 may block the inner space of the arc chamber 21 from arbitrarily communicating with the inner space of the upper frame 11. The sealing member 23 seals the lower side of the arc chamber 21 together with the insulating plate 13 and the supporting plate 14.

Specifically, an upper side of the sealing member 23 is coupled to the lower side of the arc chamber 21. In addition, a radially inner side of the sealing member 23 is coupled to an outer circumference of the insulating plate 13, and a lower side of the sealing member 23 is coupled to the supporting plate 14.

Accordingly, the arc generated in the arc chamber 21 and the arc extinguished by the extinguishing gas do not arbitrarily flow out to the inner space of the upper frame 11.

Further, the sealing member 23 may be configured to block an inner space of a cylinder 37 from arbitrarily communicating with the inner space of the frame part 10.

(3) Description of Core Part 30

The core part 30 moves the movable contactor part 40 upward as the control power is applied. In addition, when the application of the control power is released, the core part 30 moves the movable contactor part 40 downward again.

The core part 30 may be electrically connected to an external control power supply (not shown) to receive the control power.

The core part 30 is located below the opening/closing part 20. In addition, the core part 30 is accommodated in the lower frame 12. The core part 30 and the opening/closing part 20 may be electrically and physically separated from each other by the insulating plate 13 and the supporting plate 14.

The movable contactor part 40 is located between the core part 30 and the opening/closing part 20. The movable contactor part 40 may be moved by the driving force applied by the core part 30. Accordingly, the movable contactor 43 and the fixed contactor 22 can be brought into contact with each other so that current can flow through the direct current relay 1.

The core part 30 includes the fixed core 31, the movable core 32, the yoke 33, a bobbin 34, coils 35, the return spring 36, and the cylinder 37.

The fixed core 31 is magnetized by a magnetic field generated in the coils 35 to generate an electromagnetic attractive force. The movable core 32 is moved toward the fixed core 31 (in an upward direction in FIG. 3) by the electromagnetic attractive force.

The fixed core 31 is not moved. That is, the fixed core 31 is fixedly coupled to the supporting plate 14 and the cylinder 37.

The fixed core 31 may be provided in any form capable of being magnetized by the magnetic field so as to generate an electromagnetic force. In one embodiment, the fixed core 31 may be provided as a permanent magnet, an electromagnet, or the like.

The fixed core 31 is partially accommodated in an upper space inside the cylinder 37. In addition, an outer circumference of the fixed core 31 may come into contact with an inner circumference of the cylinder 37.

The fixed core 31 is located between the supporting plate 14 and the movable core 32.

A through hole (not shown) is formed in a central part of the fixed core 31. The shaft 44 is coupled through the through hole (not shown) to be movable up and down.

The fixed core 31 is located to be spaced apart from the movable core 32 by a predetermined distance. Accordingly, a distance by which the movable core 32 can move toward the fixed core 31 may be limited to the predetermined distance. Accordingly, the predetermined distance may be defined as a "moving distance of the movable core 32."

One end portion of the return spring 36, i.e., an upper end portion of the return spring 36 in the illustrated embodiment may be brought into contact with a lower side of the fixed core 31. When the movable core 32 is moved upward as the fixed core 31 is magnetized, the return spring 36 is compressed and stores a restoring force.

Accordingly, when the application of the control power is released and the magnetization of the fixed core 31 is terminated, the movable core 32 may be returned to the lower side by the restoring force.

When the control power is applied, the movable core 32 is moved toward the fixed core 31 by the electromagnetic attractive force generated by the fixed core 31.

As the movable core 32 is moved, the shaft 44 coupled to the movable core 32 is moved toward the fixed core 31, i.e., upward in the illustrated embodiment. In addition, as the shaft 44 is moved, the movable contactor part 40 coupled to the shaft 44 is moved upward.

Accordingly, the fixed contactor 22 and the movable contactor 43 may be brought into contact with each other so that the direct current relay 1 can be electrically connected to the external power supply and the load.

The movable core 32 may be provided in any form capable of receiving an attractive force by an electromagnetic force. In one embodiment, the movable core 32 may be formed of a magnetic material or provided as a permanent magnet, an electromagnet, or the like.

The movable core 32 is accommodated in the cylinder 37. In addition, the movable core 32 may be moved in the cylinder 37 in the longitudinal direction of the cylinder 37, for example, in the vertical direction in the illustrated embodiment.

Specifically, the movable core 32 may be moved in a direction toward the fixed core 31 and away from the fixed core 31.

The movable core 32 is coupled to the shaft 44. The movable core 32 may be moved integrally with the shaft 44. When the movable core 32 is moved upward or downward, the shaft 44 is also moved upward or downward. Accordingly, the movable contactor 43 is also moved upward or downward.

The movable core 32 is located below the fixed core 31. The movable core 32 is spaced apart from the fixed core 31 by the predetermined distance. As described above, the predetermined distance is a distance by which the movable core 32 can be moved in the vertical direction.

The movable core 32 is formed to extend in the longitudinal direction. A hollow portion extending in the longitudinal direction is formed to be recessed in the movable core 32 by a predetermined distance. The return spring 36 and the lower side of the shaft 44 coupled through the return spring 36 are partially accommodated in the hollow portion.

A through hole may be formed through a lower side of the hollow portion in the longitudinal direction. The hollow portion and the through hole communicate with each other. A lower end portion of the shaft 44 inserted into the hollow portion may proceed toward the through hole.

A space part is formed to be recessed in a lower end portion of the movable core 32 by a predetermined distance. The space part communicates with the through hole. A lower head portion of the shaft 44 is located in the space part.

The yoke 33 forms a magnetic circuit as the control power is applied. The magnetic circuit formed by the yoke 33 may be configured to control a direction of a magnetic field formed by the coils 35.

Accordingly, when the control power is applied, the coils 35 may form a magnetic field in a direction in which the movable core 32 is moved toward the fixed core 31. The yoke 33 may be formed of a conductive material capable of allowing electrical connection.

The yoke 33 is accommodated in the lower frame 12. The yoke 33 surrounds the coils 35. The coils 35 may be accommodated in the yoke 33 so as to be spaced apart from an inner circumferential surface of the yoke 33 by a predetermined distance.

The bobbin 34 is accommodated in the yoke 33. That is, the yoke 33, the coils 35, and the bobbin 34 on which the coils 35 are wound may be sequentially disposed in a direction from an outer circumference of the lower frame 12 toward a radially inner side of the lower frame 12.

An upper side of the yoke 33 may come into contact with the supporting plate 14. In addition, an outer circumference of the yoke 33 may come into contact with an inner circumference of the lower frame 12 or may be located to be spaced apart from the inner circumference of the lower frame 12 by a predetermined distance.

The coils 35 are wound around the bobbin 34. The bobbin 34 is accommodated in the yoke 33.

The bobbin 34 may include upper and lower portions formed in a flat plate shape, and a cylindrical column portion formed to extend in the longitudinal direction to connect the upper and lower portions. That is, the bobbin 34 has a bobbin shape.

The upper portion of the bobbin 34 comes into contact with a lower side of the supporting plate 14. The coils 35 are wound around the column portion of the bobbin 34. A wound thickness of the coils 35 may be configured to be equal to or smaller than a diameter of each of the upper and lower portions of the bobbin 34.

A hollow portion is formed through the column portion of the bobbin 34 extending in the longitudinal direction. The cylinder 37 may be accommodated in the hollow portion. The column portion of the bobbin 34 may be disposed to have the same central axis as the fixed core 31, the movable core 32, and the shaft 44.

The coils 35 generate a magnetic field due to the applied control power. The fixed core 31 may be magnetized by the magnetic field generated by the coils 35 and thus an electromagnetic attractive force may be applied to the movable core 32.

The coils 35 are wound around the bobbin 34. Specifically, the coils 35 are wound around the column portion of the bobbin 34 and stacked on a radial outer side of the column portion. The coils 35 are accommodated in the yoke 33.

When control power is applied, the coils 35 generate a magnetic field. In this case, a strength or direction of the magnetic field generated by the coils 35 may be controlled by the yoke 33. The fixed core 31 is magnetized by the magnetic field generated by the coils 35.

When the fixed core 31 is magnetized, the movable core 32 receives an electromagnetic force, i.e., an attractive force in a direction toward the fixed core 31. Accordingly, the movable core 32 is moved in a direction toward the fixed core 31, i.e., upward in the illustrated embodiment.

The return spring 36 provides a restoring force for the movable core 32 to return to its original location when the application of the control power is released after the movable core 32 is moved toward the fixed core 31.

As the movable core 32 is moved toward the fixed core 31, the return spring 36 stores the restoring force while being compressed. At this point, the stored restoring force may preferably be smaller than the electromagnetic attractive force, which is exerted on the movable core 32 as the fixed core 31 is magnetized. This is to prevent the movable core 32 from being arbitrarily returned to its original location by the return spring 36 while the control power is applied.

When the application of the control power is released, the movable core 32 receives only the restoring force by the return spring 36. Of course, gravity due to an empty weight of the movable core 32 may also be applied to the movable core 32. Accordingly, the movable core 32 can be moved in a direction away from the fixed core 31 to be returned to the original location.

The return spring 36 may be provided in any form that is deformed to store the restoring force and returned to its original state to transmit the restoring force to the outside. In one embodiment, the return spring 36 may be provided as a coil spring.

The shaft 44 is coupled through the return spring 36. The shaft 44 may move in the vertical direction regardless of the deformation of the return spring 36 in the coupled state with the return spring 36.

The return spring 36 is accommodated in the hollow portion formed to be recessed in an upper side of the movable core 32. In addition, one end portion of the return spring 36 facing the fixed core 31, i.e., an upper end portion of the return spring 36 in the illustrated embodiment is accommodated in a hollow portion formed to be recessed in the lower side of the fixed core 31.

The cylinder 37 accommodates the fixed core 31, the movable core 32, the return spring 36, and the shaft 44. The movable core 32 and the shaft 44 may be moved in the upward and downward directions in the cylinder 37.

The cylinder 37 is located in the hollow portion formed in the column portion of the bobbin 34. An upper end portion of the cylinder 37 comes into contact with a lower side surface of the supporting plate 14.

A side surface of the cylinder 37 comes into contact with an inner circumferential surface of the column portion of the bobbin 34. An upper opening of the cylinder 37 may be sealed by the fixed core 31. A lower side surface of the cylinder 37 may come into contact with an inner surface of the lower frame 12.

(4) Description of Movable Contactor Part 40

The movable contactor part 40 includes the movable contactor 43 and components for moving the movable contactor 43. The direct current relay 1 may be electrically connected to an external power supply or a load by the movable contactor part 40.

The movable contactor part 40 is accommodated in the inner space of the upper frame 11. In addition, the movable contactor part 40 is accommodated in the arc chamber 21 to be movable up and down.

The fixed contactor 22 is located above the movable contactor part 40. The movable contactor part 40 is accommodated in the arc chamber 21 to be movable in a direction toward the fixed contactor 22 and a direction away from the fixed contactor 22.

The core part 30 is located below the movable contactor part 40. The movement of the movable contactor part 40 can be achieved by the movement of the movable core 32.

The movable contactor part 40 includes a housing 41, a cover 42, the movable contactor 43, the shaft 44, and an elastic part 45.

The housing 41 accommodates the movable contactor 43 and the elastic part 45 elastically supporting the movable contactor 43.

In the illustrated embodiment, the housing 41 is formed such that one side and another side opposite to the one side are open. The movable contactor 43 may be inserted through the open portions.

Unopened side surfaces of the housing 41 may be configured to surround the accommodated movable contactor 43.

The cover 42 is provided on an upper side of the housing 41. The cover 42 covers an upper surface of the movable contactor 43 accommodated in the housing 41.

The housing 41 and the cover 42 may preferably be formed of an insulating material to prevent unexpected electrical connection. In one embodiment, the housing 41 and the cover 42 may be formed of synthetic resin or the like.

A lower side of the housing 41 is connected to the shaft 44. When the movable core 32 connected to the shaft 44 is moved upward or downward, the housing 41 and the movable contactor 43 accommodated in the housing 41 may also be moved upward or downward.

The housing 41 and the cover 42 may be coupled by arbitrary members. In one embodiment, the housing 41 and the cover 42 may be coupled by coupling members (not shown) such as a bolt and a nut.

The movable contactor 43 comes into contact with the fixed contactor 22 as control power is applied, so that the direct current relay 1 can be electrically connected to an external power supply and a load. In addition, when the application of the control power is released, the movable contactor 43 is separated from the fixed contactor 22, and thus the direct current relay 1 is electrically disconnected from the external power supply and the load.

The movable contactor 43 is located adjacent to the fixed contactor 22.

An upper side of the movable contactor 43 is partially covered by the cover 42. In one embodiment, a portion of the upper surface of the movable contactor 43 may be brought into contact with a lower side surface of the cover 42.

A lower side of the movable contactor 43 is elastically supported by the elastic part 45. In order to prevent the movable contactor 43 from being arbitrarily moved downward, the elastic part 45 may elastically support the movable contactor 43 in a compressed state by a predetermined distance.

The movable contactor 43 is formed to extend in a longitudinal direction, i.e., in a left-right direction in the illustrated embodiment. That is, a length of the movable contactor 43 is formed to be longer than a width thereof. Accordingly, both end portions of the movable contactor 43 in the longitudinal direction, which are accommodated in the housing 41, are exposed to the outside of the housing 41.

Contact protrusions may be formed to protrude upward from the both end portions by predetermined distances. The fixed contactor 22 is in contact with the contact protrusions.

The contact protrusions may be formed at locations corresponding to the fixed contactors 22_a_ and 22_b_, respectively. Accordingly, the moving distance of the movable contactor 43 can be reduced and contact reliability between the fixed contactor 22 and the movable contactor 43 can be improved.

The width of the movable contactor 43 may be the same as a spaced distance between the side surfaces of the housing 41. That is, when the movable contactor 43 is accommodated in the housing 41, both side surfaces of the movable contactor 43 in a width direction may be brought into contact with inner surfaces of the side surfaces of the housing 41. Accordingly, the state in which the movable contactor 43 is accommodated in the housing 41 can be stably maintained.

The shaft 44 transmits a driving force, which is generated in response to the operation of the core part 30, to the movable contactor part 40. Specifically, the shaft 44 is connected to the movable core 32 and the movable contactor 43. When the movable core 32 is moved upward or downward, the movable contactor 43 may also be moved upward or downward by the shaft 44.

The shaft 44 is formed to extend in the longitudinal direction, i.e., in the vertical direction in the illustrated embodiment.

The lower end portion of the shaft 44 is inserted into and coupled to the movable core 32. When the movable core 32 is moved in the vertical direction, the shaft 44 may also be moved in the vertical direction together with the movable core 32.

A body portion of the shaft 44 is coupled through the fixed core 31 to be movable up and down. The return spring 36 is coupled through the body portion of the shaft 44.

An upper end portion of the shaft 44 is coupled to the housing 41. When the movable core 32 is moved, the shaft 44 and the housing 41 may also be moved together with the movable core 32.

The upper and lower end portions of the shaft 44 may be formed to have a larger diameter than the body portion of the shaft. Accordingly, the coupled state of the shaft 44 to the housing 41 and the movable core 32 can be stably maintained.

The elastic part 45 elastically supports the movable contactor 43. When the movable contactor 43 is brought into contact with the fixed contactor 22, the movable contactor 43 may tend to be separated from the fixed contactor 22 due to an electromagnetic repulsive force.

At this point, the elastic part 45 elastically supports the movable contactor 43 to prevent the movable contactor 43 from being arbitrarily separated from the fixed contactor 22.

The elastic part 45 may be provided in any form capable of storing a restoring force by being deformed and providing the stored restoring force to another member. In one embodiment, the elastic part 45 may be provided as a coil spring.

One end portion of the elastic part 45 facing the movable contactor 43 comes into contact with the lower side of the movable contactor 43. In addition, the other end portion opposite to the one end portion comes into contact with the upper side of the housing 41.

The elastic part 45 may elastically support the movable contactor 43 in a state of storing the restoring force by being compressed by a predetermined distance. Accordingly, even when the electromagnetic repulsive force is generated between the movable contactor 43 and the fixed contactor 22, the movable contactor 43 is not arbitrarily moved.

A protrusion (not shown) inserted into the elastic part 45 may be formed to protrude from the lower side of the movable contactor 43 to enable stable coupling of the elastic part 45. Similarly, a protrusion (not shown) inserted into the elastic part 45 may also be formed to protrude from the upper side of the housing 41.

3. Description of Arc Path Formation Units 100, 200, and 300 According to Embodiments of Present Disclosure Referring to FIGS. 5 to 8, the arc path formation units 100, 200, and 300 according to one embodiment of the present disclosure are illustrated. Each of the arc path formation units 100, 200, and 300 forms magnetic fields inside the arc chamber 21. Due to current flowing through the direct current relay 1 and the formed magnetic field, an electromagnetic force is formed in the arc chamber 21.

An arc generated as the fixed contactor 22 and the movable contactor 43 are separated from each other is moved to the outside of the arc chamber 21 by the formed electromagnetic force. Specifically, the generated arc is moved in a direction of the formed electromagnetic force. Accordingly, it can be said that each of the arc path formation units 100, 200, and 300 forms an arc path A.P, which is a path through which the generated arc flows.

Each of the arc path formation units 100, 200, and 300 is located in a space formed in the upper frame 11. The arc path formation unit 100, 200, or 300 is disposed to surround the arc chamber 21. In other words, the arc chamber 21 is located inside the arc path formation unit 100, 200, or 300.

The fixed contactor 22 and the movable contactor 43 are located inside the arc path formation unit 100, 200, or 300. The arc generated as the fixed contactor 22 and the movable contactor 43 are separated from each other may be induced by an electromagnetic force formed by the arc path formation unit 100, 200, or 300.

Each of the arc path formation units 100, 200, and 300 according to various embodiments of the present disclosure includes Halbach arrays or magnet parts. The Halbach arrays or the magnet parts form magnetic fields inside the arc path formation unit 100, 200, or 300 in which the fixed contactor 22 and the movable contactor 43 are accommodated. At this point, the Halbach array or the magnet part may form a magnetic field by itself and between each other.

The magnetic fields formed by the Halbach array and the magnet part form an electromagnetic force together with current flowing through the fixed contactor 22 and the movable contactor 43. The formed electromagnetic force induces an arc that is generated when the fixed contactor 22 and the movable contactor 43 are separated from each other.

At this point, each of the arc path formation units 100, 200, and 300 forms the electromagnetic force in a direction away from a central part C of each of space parts 115, 215, and 315. Accordingly, an arc path A.P is also formed in the direction away from the central part C of the space part.

As a result, each component provided in the direct current relay 1 is not damaged by the generated arc. Furthermore, the generated arc may be quickly discharged to the outside of the arc chamber 21.

Hereinafter, the configuration of each of the arc path formation units 100, 200, and 300 and the arc path A.P formed by each of the arc path formation units 100, 200, and 300 will be described in detail with reference to the accompanying drawings.

Each of the arc path formation units 100, 200, and 300 according to various embodiments described below may include a Halbach array located on one or more of front and rear sides of each of the arc path formation units 100, 200, and 300.

As will be described below, the rear side may be defined as a direction adjacent to a first surface 111, 211, or 311, and the front side may be defined as a direction adjacent to a second surface 112, 212, or 312.

In addition, a left side may be defined as a direction adjacent to a third surface 113, 213, or 313, and a right side may be defined as a direction adjacent to a fourth surface 114, 214, or 314.

(1) Description of Arc Path Formation Unit 100 According to One Embodiment of Present Disclosure Hereinafter, an arc path formation unit 100 according to one embodiment of the present disclosure will be described in detail with reference to FIG. 5.

Figure 5:
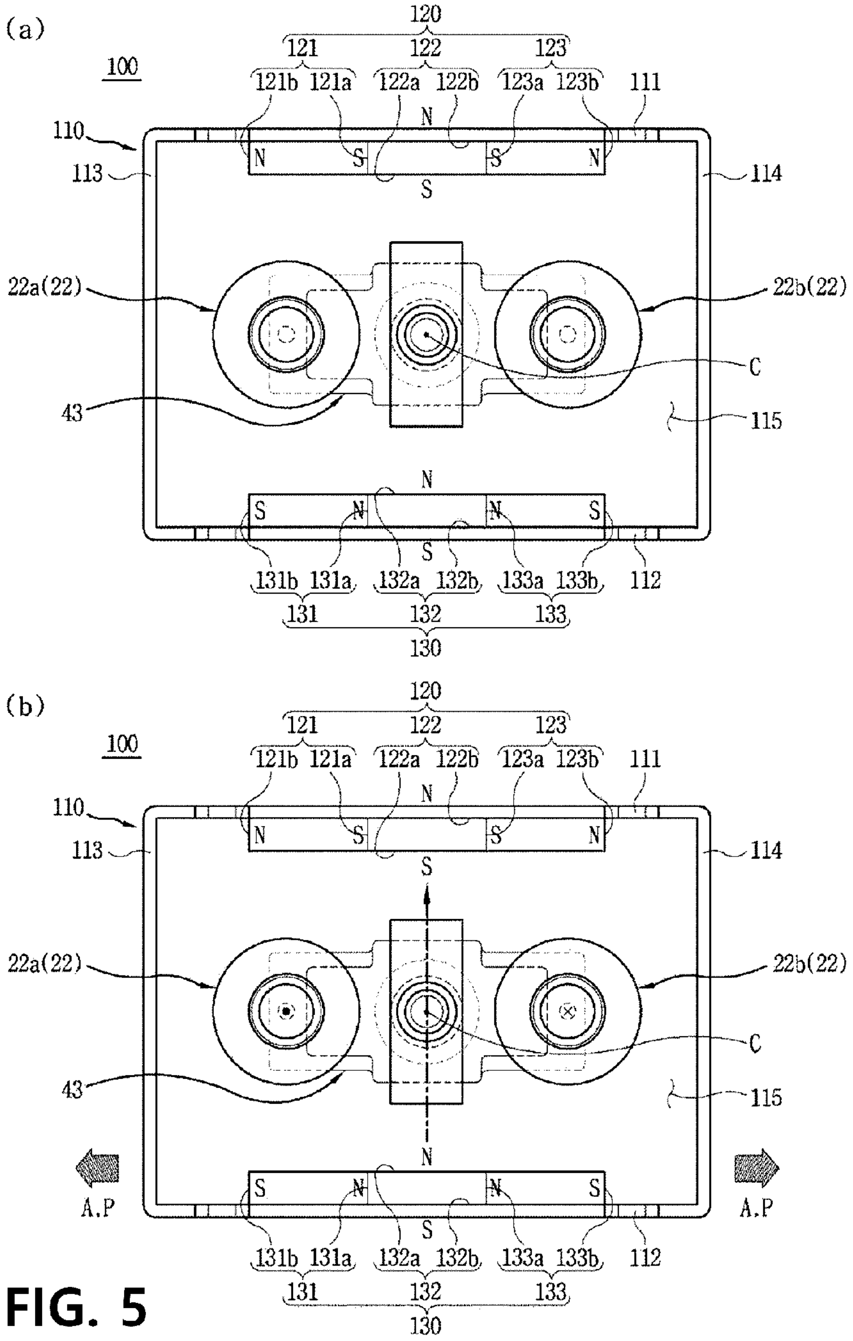
FIG. 5 is a conceptual view illustrating an arc path formation unit according to one embodiment of the present disclosure and magnetic fields and arc paths formed by the arc path formation unit.

Referring to FIG. 5, the arc path formation unit 100 according to the illustrated embodiment includes a magnet frame 110, a first Halbach array 120, and a second Halbach array 130.

The magnet frame 110 forms a frame of the arc path formation unit 100. The first Halbach array 12 and the second Halbach array 130 are disposed in the magnet frame 110. In one embodiment, the first Halbach array 120 and the second Halbach array 130 may be coupled to the magnet frame 110.

The magnet frame 110 has a rectangular cross section formed to extend in the longitudinal direction, i.e., in the left-right direction in the illustrated embodiment. The shape of the magnet frame 110 may be changed depending on shapes of the upper frame 11 and the arc chamber 21.

The magnet frame 110 includes a first surface 111, a second surface 112, a third surface 113, a fourth surface 114, and a space part 115.

The first surface 111, the second surface 112, the third surface 113, and the fourth surface 114 form an outer circumferential surface of the magnet frame 110. That is, the first surface 111, the second surface 112, the third surface 113, and the fourth surface 114 may serve as walls of the magnet frame 110.

An outer side of each of the first surface 111, the second surface 112, the third surface 113, and the fourth surface 114 may be in contact with or fixedly coupled to an inner surface of the upper frame 11. In addition, the first Halbach array 120 and the second Halbach array 130 may be located on inner sides of the first surface 111, the second surface 112, the third surface 113, and the fourth surface 114.

In the illustrated embodiment, the first surface 111 forms a rear side surface. The second surface 112 forms a front side surface and faces the first surface 111. In addition, the third surface 113 forms a left side surface. The fourth surface 114 forms a right side surface and faces the third surface 113.

That is, the first surface 111 and the second surface 112 face each other with the space part 115 therebetween. In addition, the third surface 113 and the fourth surface 114 face each other with the space part 115 therebetween.

The first surface 111 is continuous with the third surface 113 and the fourth surface 114. The first surface 111 may be coupled to the third surface 113 and the fourth surface 114 at predetermined angles. In one embodiment, the predetermined angle may be a right angle.

The second surface 112 is continuous with the third surface 113 and the fourth surface 114. The second surface 112 may be coupled to the third surface 113 and the fourth surface 114 at predetermined angles. In one embodiment, the predetermined angle may be a right angle.

Each of corners at which the first to fourth surfaces 111 to 114 are connected to each other may be chamfered.

Coupling members (not shown) may be provided to couple the first and second Halbach arrays 120 and 130 to the respective surfaces 111, 112, 113, and 114.

Although not shown in the drawing, an arc discharge hole (not shown) may be formed through one or more of the first surface 111, the second surface 112, the third surface 113, and the fourth surface 114. The arc discharge hole (not shown) may serve as a path through which an arc generated in the space part 115 is discharged.

A space surrounded by the first to fourth surfaces 111 to 114 may be defined as the space part 115.

The fixed contactor 22 and the movable contactor 43 are accommodated in the space part 115. In addition, the arc chamber 21 is accommodated in the space part 115.

In the space part 115, the movable contactor 43 may be moved in a direction toward the fixed contactor 22 (i.e., the downward direction) or a direction away from the fixed contactor 22 (i.e., the upward direction).

In addition, an arc path A.P of an arc generated in the arc chamber 21 is formed in the space part 115. This is achieved by the magnetic fields formed by the first Halbach array 120 and the second Halbach array 130.

A central portion of the space part 115 may be defined as the central part C. A straight line distance from each of corners at which the first to fourth surfaces 111 to 114 are connected to each other to the central part C may be formed to be equal to each other.

The central part C may be located between the first fixed contactor **22*a* and the second fixed contactor 22*b*. In addition, a central portion of the movable contactor part 40 is located vertically below the central part C. That is, a central portion of each of the housing 41, the cover 42, the movable contactor 43, the shaft 44, the elastic part 45**, and the like is located vertically below the central part C.

Accordingly, when the generated arc is moved toward the central part C, the above components may be damaged. To prevent this, the arc path formation unit 100 according to the present embodiment includes the first Halbach array 120 and the second Halbach array 130.

In the illustrated embodiment, the plurality of magnetic materials constituting the first Halbach array 120 are continuously disposed side by side from the left side to the right side. That is, in the illustrated embodiment, the first Halbach array 120 is formed to extend in the left-right direction.

The first Halbach array 120 may form a magnetic field together with another magnetic material. In the illustrated embodiment, the first Halbach array 120 may form a magnetic field together with the second Halbach array 130.

The first Halbach array 120 may be located adjacent to any one surface of the first and second surfaces 111 and 112. In one embodiment, the first Halbach array 120 may be coupled to an inner side (i.e., the side in a direction toward the space part 115) of the any one surface.

In the illustrated embodiment, the first Halbach array 120 is disposed on the inner side of the first surface 111 and adjacent to the first surface 111 and faces the second Halbach array 130 located on the inner side of the second surface 112.

The space part 115, and the fixed contactor 22 and the movable contactor 43 accommodated in the space part 115 are located between the first Halbach array 120 and the second Halbach array 130.

The first Halbach array 120 can enhance the strength of the magnetic field formed by itself and the magnetic field formed together with the second Halbach array 130. Since the process of enhancing the direction and magnetic field of the magnetic field formed by the first Halbach array 120 is a well-known technique, a detailed description thereof will be omitted.

In the illustrated embodiment, the first Halbach array 120 includes a first block 121, a second block 122, and a third block 123. It will be understood that the plurality of magnetic materials constituting the first Halbach array 120 are named as the blocks 121, 122, and 123, respectively.

The first to third blocks 121, 122, and 123 may each be formed of a magnetic material. In one embodiment, the first to third blocks 121, 122, and 123 may each be provided as a permanent magnet, an electromagnet, or the like.

The first to third blocks 121, 122, and 123 may be disposed side by side in one direction. In the illustrated embodiment, the first to third blocks 121, 122, and 123 are disposed side by side in a direction in which the first surface 111 extends, that is, in the left-right direction.

The first block 121 is located on the leftmost side. That is, the first block 121 is located adjacent to the third surface 113. In addition, the third block 123 is located on the rightmost side. That is, the third block 123 is located adjacent to the fourth surface 114. The second block 122 is located between the first block 121 and the third block 123.

In one embodiment, the second block 122 may be in contact with each of the first and third blocks 121 and 123.

The first block 121 may be disposed to overlap the first fixed contactor 22*a* and a first block 131 of the second Halbach array 130 in a direction toward the second Halbach array 130 or the space part 115, i.e., in a front-rear direction in the illustrated embodiment.

The second block 122 may be disposed to overlap the central part C and a second block 132 of the second Halbach array 130 in a direction toward the second Halbach array 130 or the space part 115, i.e., in the front-rear direction in the illustrated embodiment.

The third block 123 may be disposed to overlap the second fixed contactor 22*b* and a third block 133 of the second Halbach array 130 in a direction toward the second Halbach array 130 or the space part 115, i.e., in the front-rear direction in the illustrated embodiment.

Each of the blocks 121, 122, and 123 includes a plurality of surfaces.

Specifically, the first block 121 includes a first inner surface 121*a* facing the second block 122 and a first outer surface 121*b* opposite to the second block 122.

The second block 122 includes a second inner surface 122*a* facing the space part 115 or the second Halbach array 130 and a second outer surface 122*b* opposite to the space part 115 or the second Halbach array 130.

The third block 123 includes a third inner surface 123*a* facing the second block 122 and a third outer surface 123*b* opposite to the second block 122.

The plurality of surfaces of each of the blocks 121, 122, and 123 may be magnetized according to a predetermined rule to configure a Halbach array.

Specifically, the first to third inner surfaces 121*a*, 122*a*, 123*a* may be magnetized to the same polarity. In addition, the first to third outer surfaces 121*b*, 122*b*, and 123*b* are magnetized to a polarity different from the polarity of the first to third inner surfaces 121*a*, 122*a*, and 123*a*.

At this point, the first to third inner surfaces 121*a*, 122*a*, 123*a* may be magnetized to the same polarity as first to third outer surfaces 131*b*, 132*b*, and 133*b* of the second Halbach array 130.

Similarly, the first to third outer surfaces 121*b*, 122*b*, and 123*b* may be magnetized to the same polarity as first to third inner surfaces 131*a*, 132*a*, and 133*a* of the second Halbach array 130.

In the illustrated embodiment, the plurality of magnetic materials constituting the second Halbach array 130 are continuously disposed side by side from the left side to the right side. That is, in the illustrated embodiment, the second Halbach array 130 is formed to extend in the left-right direction.

The second Halbach array 130 may form a magnetic field together with another magnetic material. In the illustrated embodiment, the second Halbach array 130 may form a magnetic field together with the first Halbach array 120.

The second Halbach array 130 may be located adjacent to the other surface of the first and second surfaces 111 and 112. In one embodiment, the second Halbach array 130 may be coupled to an inner side (i.e., the side in a direction toward the space part 115) of the other surface.

In the illustrated embodiment, the second Halbach array 130 is disposed on an inner side of the second surface 112 and adjacent to the second surface 112 and faces the first Halbach array 120 located on the inner side of the first surface 111.

The space part 115, and the fixed contactor 22 and the movable contactor 43 accommodated in the space part 115 are located between the second Halbach array 130 and the first Halbach array 120.

The second Halbach array 130 can enhance the strength of the magnetic field formed by itself and the strength of the magnetic field formed together with the first Halbach array 120. Since the process of enhancing the direction and magnetic field of the magnetic field formed by the second Halbach array 130 is a well-known technique, a detailed description thereof will be omitted.

In the illustrated embodiment, the second Halbach array 130 includes the first block 131, the second block 132, and the third block 133. It will be understood that the plurality of magnetic materials constituting the second Halbach array 130 are named as the blocks 131, 132, and 133, respectively.

The first to third blocks 131, 132, and 133 may each be formed of a magnetic material. In one embodiment, the first to third blocks 131, 132, and 133 may each be provided as a permanent magnet, an electromagnet, or the like.

The first to third blocks 131, 132, and 133 may be disposed side by side in one direction. In the illustrated embodiment, the first to third blocks 131, 132, and 133 are disposed side by side in a direction in which the first surface 111 extends, that is, in the left-right direction.

The first block 131 is located on the leftmost side. That is, the first block 131 is located adjacent to the third surface 113. In addition, the third block 133 is located on the rightmost side. That is, the third block 133 is located adjacent to the fourth surface 114. In addition, the second block 132 is located between the first block 131 and the third block 133.

In one embodiment, the second block 132 may be in contact with each of the first block 131 and the third block 133.

The first block 131 may be disposed to overlap the first fixed contactor 22*a* and the first block 121 of the first Halbach array 120 in a direction toward the first Halbach array 120 or the space part 115, i.e., in the front-rear direction in the illustrated embodiment.

The second block 132 may be disposed to overlap the central part C and the second block 122 of the first Halbach array 120 in a direction toward the first Halbach array 120 or the space part 115, i.e., in the front-rear direction in the illustrated embodiment.

The third block 133 may be disposed to overlap the second fixed contactor 22*b* and the third block 123 of the first Halbach array 120 in a direction toward the first Halbach array 120 or the space part 115, i.e., in the front-rear direction in the illustrated embodiment.

Each of the blocks 131, 132, and 133 includes a plurality of surfaces.

Specifically, the first block 131 includes a first inner surface 131*a* facing the second block 132 and a first outer surface 131*b* opposite to the second block 132.

The second block 132 includes a second inner surface 132*a* facing the space part 115 or the first Halbach array 120, and a second outer surface 132*b* opposite to the space part 115 or the first Halbach array 120.

The third block 133 includes a third inner surface 133*a* facing the second block 132 and a third outer surface 133*b* opposite to the second block 132.

The plurality of surfaces of each of the blocks 131, 132, and 133 may be magnetized according to a predetermined rule to configure a Halbach array.

Specifically, the first to third inner surfaces 131*a*, 132*a*, 133*a* magnetized to the same polarity. In addition, the first to third outer surfaces 131*b*, 132*b*, and 133*b* are magnetized to a polarity different from the polarity of the first to third inner surfaces 131*a*, 132*a*, and 133*a*.

At this point, the first to third inner surfaces 131*a*, 132*a*, 133*a* magnetized to the same polarity as the first to third outer surfaces 121*b*, 122*b*, and 123*b* of the first Halbach array 120.

Similarly, the first to third outer surfaces 131*b*, 132*b*, and 133*b* magnetized to the same polarity as the first to third inner surfaces 121*a*, 122*a*, 123*a* of the first Halbach array 120.

Hereinafter, the arc path A.P formed by the arc path formation unit 100 according to the present embodiment will be described in detail with reference to FIG. 5B.

Referring to FIG. 5B, the first to third inner surfaces 121*a*, 122*a*, 123*a* of the first Halbach array 120 are magnetized to S poles. In addition, by the above-described rule, the first to third inner surfaces 131*a*, 132*a*, and 133*a* of the second Halbach array 130 are magnetized to N poles.

Accordingly, a magnetic field in a direction from the second inner surface 122*a* toward the second inner surface 132*a* is formed between the second block 122 of the first Halbach array 120 and the second block 132 of the second Halbach array 130.

In the embodiment illustrated in FIG. 5B, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward a left side.

Accordingly, an arc path A.P in the vicinity of the first fixed contactor 22*a* is also formed toward the left side.

Similarly, when the Fleming's left-hand rule is applied to the second fixed contactor 22*b*, an electromagnetic force generated in the vicinity of the second fixed contactor 22*b* is formed toward the right side.

Accordingly, an arc path A.P in the vicinity of the second fixed contactor 22*b* is also formed toward the right side.

As a result, the arc paths A.P formed in the vicinity of each of the fixed contactors 22*a* and 22*b* are formed in opposite directions and thus do not meet each other.

Accordingly, in the arc path formation unit 100 according to the present embodiment, the strength of each of the magnetic field formed inside the arc chamber 21 and the electromagnetic force formed by the magnetic field can be enhanced by the first and second Halbach arrays 120 and 130.

The direction of the electromagnetic force formed by the arc path formation unit 100 induces arcs generated by the fixed contactors 22*a* and 22*b* in opposite directions.

Accordingly, damage to each component of the direct current relay 1 disposed adjacent to the central part C can be prevented. Furthermore, since the generated arc can be quickly discharged to the outside, operational reliability of the direct current relay 1 can be improved.

In addition, in the case of the arc path formation unit 100 according to the present embodiment, it will be understood that the polarities of the first and second Halbach arrays 120 and 130 and the direction of the current flowing through the direct current relay 1 should be changed simultaneously.

That is, when only one of the polarities of the first and second Halbach arrays 120 and 130 and the direction of the current flowing through the direct current relay 1 is changed, the arc path is formed to extend to the central part C.

In addition, in order to enhance the strength of each of the magnetic fields formed by the first and second Halbach arrays 120 and 130, a magnet part (not shown) having polarities in the front-rear direction may be provided on at least one of the other surfaces of the magnet frame 110, that is, the third surface 113 and the fourth surface 114.

In the above case, the polarities of the provided magnet part (not shown) may be determined to correspond to the polarities of the second inner surfaces 122*a* and 132*a* respectively of the first and second Halbach arrays 120 and 130.

That is, in the embodiment illustrated in FIG. 5, the magnet part (not shown) provided on the third surface 113 or the fourth surface 114 is preferably magnetized such that a portion thereof in a direction facing the first Halbach array 120 is magnetized to an S pole and a portion thereof in a direction facing the second Halbach array 130 is magnetized to an N pole.

In the above-described embodiment, the strength of the magnetic field formed inside the arc chamber 21 is enhanced, and the strength of the electromagnetic force is also enhanced accordingly, so that the arc path A.P can be more effectively formed.

(2) Description of Arc Path Formation Unit 200 According to Another Embodiment of Present Disclosure Hereinafter, an arc path formation unit 200 according to another embodiment of the present disclosure will be described in detail with reference to FIGS. 6 to 7.

Figure 6:
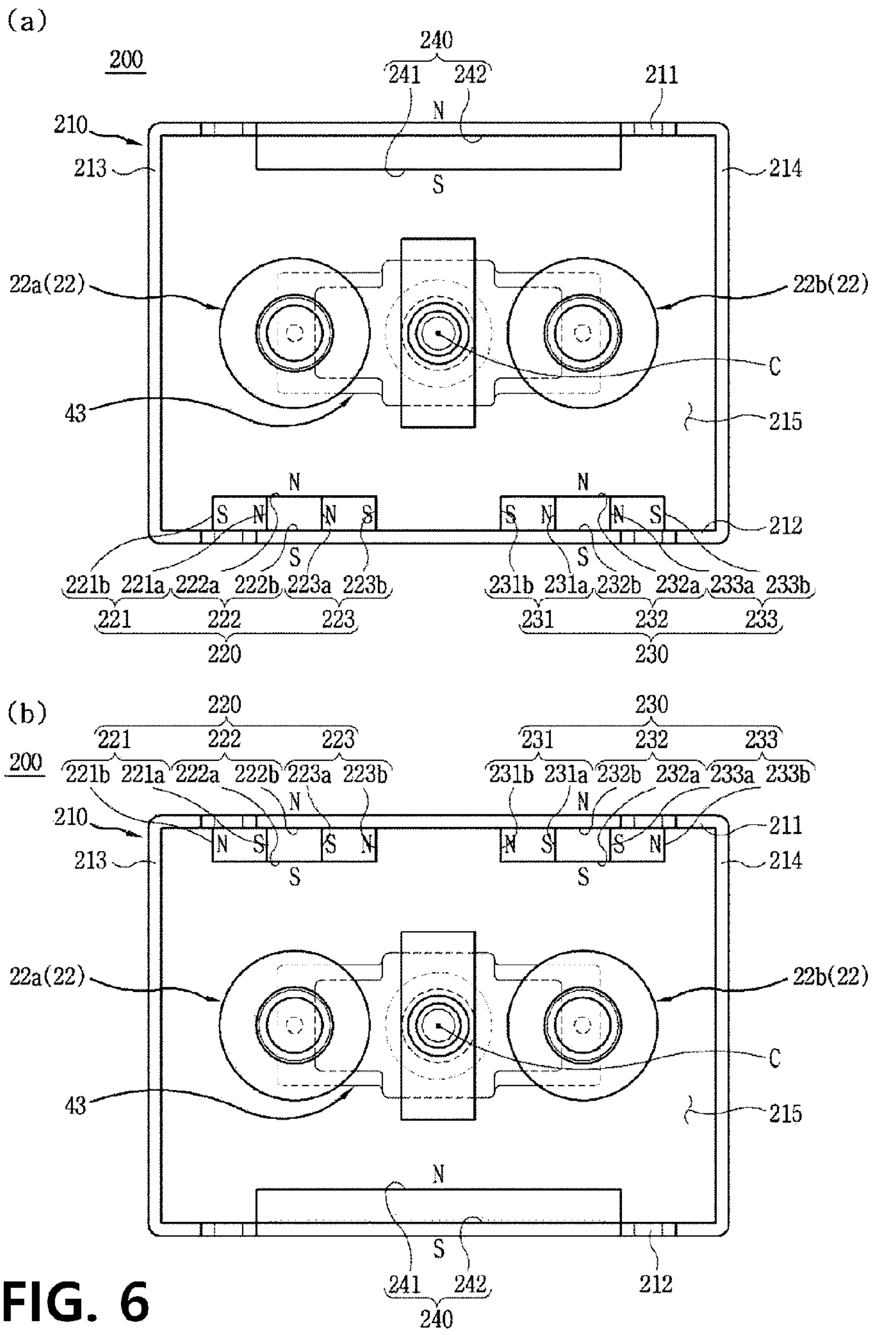
FIG. 6 is a conceptual view illustrating an arc path formation unit according to another embodiment of the present disclosure.
Figure 7:
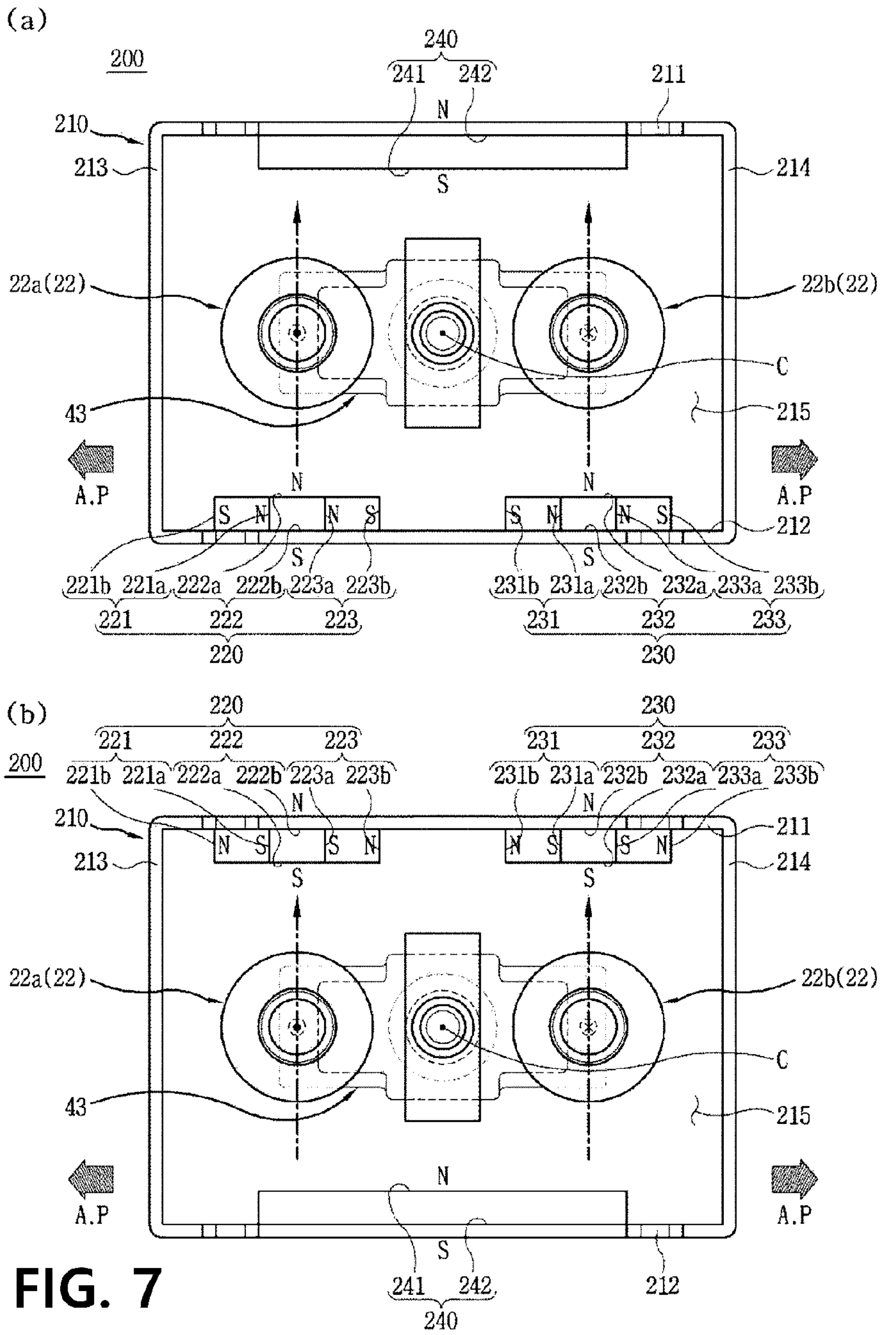
FIG. 7 is a conceptual view illustrating magnetic fields and arc paths formed by the arc path formation unit according to the embodiment of FIG. 6.

Referring to FIG. 6, the arc path formation unit 200 according to the illustrated embodiment includes a magnet frame 210, a first Halbach array 220, a second Halbach array 230, and a magnet part 240.

The magnet frame 210 according to the present embodiment has the same structure and function as the magnet frame 110 according to the above-described embodiment. However, there is a difference in the arrangement method of the first and second Halbach arrays 220 and 230 and the magnet part 240 disposed in the magnet frame 210 according to the present embodiment.

Accordingly, a description of the magnet frame 210 will be replaced with the description of the magnet frame 110 according to the above-described embodiment.

In the illustrated embodiment, the plurality of magnetic materials constituting the first Halbach array 220 are continuously disposed side by side from the left side to the right side. That is, in the illustrated embodiment, the first Halbach array 220 is formed to extend in the left-right direction.

The first Halbach array 220 may form a magnetic field together with another magnetic material. In the illustrated embodiment, the first Halbach array 220 may form magnetic fields together with the second Halbach array 230 and the magnet part 240.

The first Halbach array 220 may be located adjacent to any one surface of first and second surfaces 211 and 212. In one embodiment, the first Halbach array 220 may be coupled to an inner side (i.e., the side in a direction toward a space part 215) of the any one surface.

In the embodiment illustrated in FIG. 6A, the first Halbach array 220 may be disposed on an inner side of the second surface 212 and adjacent to the second surface 212 and faces the magnet part 240 located on an inner side of the first surface 211.

In the embodiment illustrated in FIG. 6B, the first Halbach array 220 may be disposed on the inner side of the first surface 211 and adjacent to the first surface 211 and faces the magnet part 240 located on the inner side of the second surface 212.

The space part 215, and the fixed contactor 22 and the movable contactor 43 accommodated in the space part 215 are located between the first Halbach array 220 and the magnet part 240. In the illustrated embodiment, the first fixed contactor 22*a* and the movable contactor 43 are located between the first Halbach array 220 and the magnet part 240.

The first Halbach array 220 may be disposed in parallel to the second Halbach array 230 in an extending direction thereof. In the illustrated embodiment, the first Halbach array 220 extends in the left-right direction and is disposed in parallel to the second Halbach array 230 in the left-right direction. The first Halbach array 220 is located adjacent to the second Halbach array 230.

The first Halbach array 220 may be located to be biased to any one surface of a third surface 213 and a fourth surface 214. In the illustrated embodiment, the first Halbach array 220 is located to be biased to the third surface 213.

The first Halbach array 220 can enhance the strength of the magnetic field formed by itself and the magnetic fields formed together with the second Halbach array 230 and the magnet part 240. Since the process of enhancing the direction and magnetic field of the magnetic field formed by the first Halbach array 220 is a well-known technique, a detailed description thereof will be omitted.

In the illustrated embodiment, the first Halbach array 220 includes a first block 221, a second block 222, and a third block 223. It will be understood that the plurality of magnetic materials constituting the first Halbach array 220 are named as the blocks 221, 222, and 223, respectively.

The first to third blocks 221, 222, and 223 may each be formed of a magnetic material. In one embodiment, the first to third blocks 221, 222, and 223 may each be provided as a permanent magnet, an electromagnet, or the like.

The first to third blocks 221, 222, and 223 may be disposed side by side in one direction. In the illustrated embodiment, the first to third blocks 221, 222, and 223 are disposed side by side in a direction in which the first surface 211 extends, that is, in the left-right direction.

The first block 221 is located on the leftmost side. That is, the first block 221 is located adjacent to the third surface 213. In addition, the third block 223 is located on the rightmost side. That is, the third block 223 is located adjacent to the second Halbach array 230. The second block 222 is located between the first block 221 and the third block 223.

In one embodiment, the second block 222 may be in contact with each of the first and third blocks 221 and 223.

The second block 222 may be disposed to overlap the first fixed contactor 22*a* and the magnet part 240 in a direction toward the magnet part 240 or the space part 215, i.e., in the front-rear direction in the illustrated embodiment.

Each of the blocks 221, 222, and 223 includes a plurality of surfaces.

Specifically, the first block 221 includes a first inner surface 221*a* facing the second block 222 and a first outer surface 221*b* opposite to the second block 222.

The second block 222 includes a second inner surface 222*a* facing the space part 215 or the magnet part 240 and a second outer surface 222*b* opposite to the space part 215 or the magnet part 240.

The third block 223 includes a third inner surface 223*a* facing the second block 222 and a third outer surface 223*b* opposite to the second block 222.

The plurality of surfaces of each of the blocks 221, 222, and 223 may be magnetized according to a predetermined rule to configure a Halbach array.

Specifically, the first to third inner surfaces 221*a*, 222*a*, and 223*a* may be magnetized to the same polarity. In addition, the first to third outer surfaces 221*b*, 222*b*, and 223*b* are magnetized to a polarity different from the polarity of the first to third inner surfaces 221*a*, 222*a*, and 223*a*.

At this point, the first to third inner surfaces 221*a*, 222*a*, and 223*a* may be magnetized to the same polarity as first to third inner surfaces 231*a*, 232*a*, and 233*a* of the second Halbach array 230.

In addition, the first to third inner surfaces 221*a*, 222*a*, and 223*a* may be magnetized to a polarity different from that of a facing surface 241 of the magnet part 240.

Similarly, the first to third outer surfaces 221*b*, 222*b*, and 223*b* may be magnetized to the same polarity as first to third outer surfaces 231*b*, 232*b*, and 233*b* of the second Halbach array 230.

In addition, the first to third outer surfaces 221*b*, 222*b*, and 223*b* may be magnetized to the same polarity as the facing surface 241 of the magnet part 240.

In the illustrated embodiment, the plurality of magnetic materials constituting the second Halbach array 230 are continuously disposed side by side from the left side to the right side. That is, in the illustrated embodiment, the second Halbach array 230 is formed to extend in the left-right direction.

The second Halbach array 230 may form a magnetic field together with another magnetic material. In the illustrated embodiment, the second Halbach array 230 may form magnetic fields together with the first Halbach array 220 and the magnet part 240.

The second Halbach array 230 may be located adjacent to the any one surface of the first and second surfaces 211 and 212. In one embodiment, the second Halbach array 230 may be coupled to an inner side (i.e., the side in a direction toward the space part 215) of the any one surface.

In the embodiment illustrated in FIG. 6A, the second Halbach array 230 may be disposed on the inner side of the second surface 212 and adjacent to the second surface 212 and faces the magnet part 240 located on the inner side of the first surface 211.

In the embodiment illustrated in FIG. 6B, the second Halbach array 230 may be disposed on the inner side of the first surface 211 and adjacent to the first surface 211 and faces the magnet part 240 located on the inner side of the second surface 212.

The space part 215, and the fixed contactor 22 and the movable contactor 43 accommodated in the space part 215 are located between the second Halbach array 230 and the magnet part 240. In the illustrated embodiment, the second fixed contactor 22*b* and the movable contactor 43 are located between the second Halbach array 230 and the magnet part 240.

The second Halbach array 230 may be disposed in parallel to the first Halbach array 220 in an extending direction thereof. In the illustrated embodiment, the second Halbach array 230 extends in the left-right direction and is disposed in parallel to the first Halbach array 220 in the left-right direction.

The second Halbach array 230 is located adjacent to the first Halbach array 220.

The second Halbach array 230 may be located to be biased to the other surface of the third surface 213 and the fourth surface 214. In the illustrated embodiment, the second Halbach array 230 is located to be biased to the fourth surface 214.

The second Halbach array 230 can enhance the strength of the magnetic field formed by itself and the strength of the magnetic fields formed together with the first Halbach array 220 and the magnet part 240. Since the process of enhancing the direction and magnetic field of the magnetic field formed by the second Halbach array 230 is a well-known technique, a detailed description thereof will be omitted.

In the illustrated embodiment, the second Halbach array 230 includes a first block 231, a second block 232, and a third block 233. It will be understood that the plurality of magnetic materials constituting the second Halbach array 230 are named as the blocks 231, 232, and 233, respectively.

The first to third blocks 231, 232, and 233 may each be formed of a magnetic material. In one embodiment, the first to third blocks 231, 232, and 233 may each be provided as a permanent magnet, an electromagnet, or the like.

The first to third blocks 231, 232, and 233 may be disposed side by side in one direction. In the illustrated embodiment, the first to third blocks 231, 232, and 233 are disposed side by side in a direction in which the first surface 211 extends, that is, in the left-right direction.

The first block 231 is located on the leftmost side. That is, the first block 231 is located adjacent to the first Halbach array 220. In addition, the third block 233 is located on the rightmost side. That is, the third block 233 is located adjacent to the fourth surface 214. In addition, the second block 232 is located between the first block 231 and the third block 233.

In one embodiment, the second block 232 may be in contact with each of the first and third blocks 231 and 233.

The second block 232 may be disposed to overlap the second fixed contactor **22*b* and the magnet part 240 in a direction toward the magnet part 240 or the space part 215**, i.e., in the front-rear direction in the illustrated embodiment.

Each of the blocks 231, 232, and 233 includes a plurality of surfaces.

Specifically, the first block 231 includes a first inner surface **231*a* facing the second block 232 and a first outer surface 231*b* opposite to the second block 232**.

The second block 232 includes a second inner surface **232*a* facing the space part 215 or the magnet part 240 and a second outer surface 232*b* opposite to the space part 215 or the magnet part 240**.

The third block 233 includes a third inner surface **233*a* facing the second block 232 and a third outer surface 233*b* opposite to the second block 232**.

The plurality of surfaces of each of the blocks 231, 232, and 233 may be magnetized according to a predetermined rule to configure a Halbach array.

Specifically, the first to third inner surfaces **231*a*, 232*a*, and 233*a* may be magnetized to the same polarity. In addition, the first to third outer surfaces 231*b*, 232*b*, and 233*b* are magnetized to a polarity different from the polarity of the first to third inner surfaces 231*a*, 232*a*, and 233*a***.

At this point, the first to third inner surfaces **231*a*, 232*a*, and 233*a* may be magnetized to the same polarity as the first to third inner surfaces 221*a*, 222*a*, and 223*a* of the first Halbach array 220**.

In addition, the first to third inner surfaces **231*a*, 232*a*, and 233*a* may be magnetized to a polarity different from that of the facing surface 241 of the magnet part 240**.

Similarly, the first to third outer surfaces **231*b*, 232*b*, and 233*b* may be magnetized to the same polarity as first to third outer surfaces 221*b*, 222*b*, and 223*b* of the first Halbach array 220**.

In addition, the first to third outer surfaces **231*b*, 232*b*, and 233*b* may be magnetized to the same polarity as the facing surface 241 of the magnet part 240**.

The magnet part 240 forms a magnetic field by itself, or forms magnetic fields together with the first and second Halbach arrays 220 and 230. An arc path A.P may be formed inside the arc chamber 21 by the magnetic field formed by the magnet part 240.

The magnet part 240 may be provided in any form capable of being magnetized to form a magnetic field. In one embodiment, the magnet part 240 may be provided as a permanent magnet, an electromagnet, or the like.

The magnet part 240 may be located adjacent to the other surface of the first and second surfaces 211 and 212. In one embodiment, the magnet part 240 may be coupled to an inner side (i.e., the side in a direction toward the space part 215) of the other surface.

In the embodiment illustrated in FIG. 6A, the magnet part 240 is located on the first surface 211 and faces the first and second Halbach arrays 220 and 230 located adjacent to the second surface 212.

In the embodiment illustrated in FIG. 6B, the magnet part 240 is located on the second surface 212 and faces the first and second Halbach arrays 220 and 230 located adjacent to the first surface 211.

The first and second fixed contactors **22*a* and 22*b* may be located between the magnet part 240 and the first Halbach array 220 and the magnet part 240 and the second Halbach array 230**, respectively.

The magnet part 240 extends in a direction in which the first surface 211 or the second surface 212 extends, i.e., in the left-right direction in the illustrated embodiment. The magnet part 240 may extend longer than a distance at which the first and second fixed contactors **22*a* and 22*b*** are spaced apart from each other.

The magnet part 240 may be located near a center of the first surface 211. In other words, the shortest distance between the magnet part 240 and the third surface 213 and the shortest distance between the magnet part 240 and the fourth surface 214 may be the same.

The magnet part 240 is disposed to face the first and second Halbach arrays 220 and 230 with the space part 215 therebetween.

The magnet part 240 can enhance the strength of the magnetic field formed by itself and the strength of the magnetic fields formed together with the first and second Halbach arrays 220 and 230. Since the process of enhancing the direction and magnetic field of the magnetic field formed by the magnet part 240 is well known in the art, a detailed description thereof will be omitted.

The magnet part 240 includes a plurality of surfaces.

Specifically, the magnet part 240 includes the facing surface 241 facing the space part 215 or the first and second Halbach arrays 220 and 230, and an opposing surface 242 opposite to the space part 215 or the first and second Halbach arrays 220 and 230.

Each surface of the magnet part 240 may be magnetized according to a predetermined rule.

Specifically, the opposing surface 241 may be magnetized to a polarity different from that of the opposing surface 242.

In addition, the facing surface 241 may be magnetized to a polarity different from that of the first to third inner surfaces **221*a*, 222*a*, and 223*a* of the first Halbach array 220 and the first to third inner surfaces 231*a*, 232*a*, and 233*a* of the second Halbach array 230**.

Hereinafter, an arc path A.P formed by the arc path formation unit 200 according to the present embodiment will be described in detail with reference to FIG. 7.

Referring to FIG. 7A, the first to third inner surfaces **221*a*, 222*a*, and 223*a* of the first Halbach array 220 are magnetized to N poles. In addition, by the above-described rule, the first to third inner surfaces 231***a*, 232*a*, and 233*a* of the second Halbach array 230 are also magnetized to N poles.

At this point, the facing surface 241 of the magnet part 240 is magnetized to an S pole opposite to the polarity of the first to third inner surfaces 221*a*, 222*a*, and 223*a* and the first to third inner surfaces 231*a*, 232*a*, and 233*a*.

Accordingly, a magnetic field in a direction from the second inner surface 222*a* toward the facing surface 241 is formed between the second block 222 of the first Halbach array 220 and the magnet part 240.

Similarly, a magnetic field in a direction from the second inner surface 232*a* toward the facing surface 241 is formed between the second block 232 of the second Halbach array 230 and the magnet part 240.

Referring to FIG. 7B, the first to third inner surfaces 221*a*, 222*a*, and 223*a* of the first Halbach array 220 are magnetized to S poles. In addition, by the above-described rule, the first to third inner surfaces 231*a*, 232*a*, and 233*a* of the second Halbach array 230 are also magnetized to S poles.

At this point, the facing surface 241 of the magnet part 240 is magnetized to an N pole opposite to the polarity of the first to third inner surfaces 221*a*, 222*a*, and 223*a* and the first to third inner surfaces 231*a*, 232*a*, and 233*a*.

Accordingly, a magnetic field in a direction from the facing surface 241 toward the second inner surface 222*a* is formed between the second block 222 of the first Halbach array 220 and the magnet part 240.

Similarly, a magnetic field in a direction from the facing surface 241 toward the second inner surface 232*a* is formed between the second block 232 of the second Halbach array 230 and the magnet part 240.

In the embodiment illustrated in FIGS. 7A and 7B, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the left side.

Accordingly, an arc path A.P in the vicinity of the first fixed contactor 22*a* is also formed toward the left side.

Similarly, when the Fleming's left-hand rule is applied to the second fixed contactor 22*b*, an electromagnetic force generated in the vicinity of the second fixed contactor 22*b* is formed toward the right side.

Accordingly, an arc path A.P in the vicinity of the second fixed contactor 22*b* is also formed toward the right side.

As a result, the arc paths A.P formed in the vicinity of each of the fixed contactors 22*a* and 22*b* are formed in opposite directions and thus do not meet each other.

Accordingly, in the arc path formation unit 200 according to the present embodiment, the strength of each of the magnetic field formed inside the arc chamber 21 and the electromagnetic force formed by the magnetic field can be enhanced by the first and second Halbach arrays 220 and 230 and the magnet part 240.

The direction of the electromagnetic force formed by the arc path formation unit 200 induces arcs generated by the fixed contactors 22*a* and 22*b* in opposite directions.

Accordingly, damage to each component of the direct current relay 1 disposed adjacent to the central part C can be prevented. Furthermore, since the generated arc can be quickly discharged to the outside, operational reliability of the direct current relay 1 can be improved.

In addition, in the case of the arc path formation unit 200 according to the present embodiment, it will be understood that the polarities of the first and second Halbach arrays 220 and 230 and the magnet part 240 and the direction of the current flowing through the direct current relay 1 should be changed simultaneously.

That is, when only one of the polarities of the first and second Halbach arrays 220 and 230 and the magnet part 240 and the direction of the current flowing through the direct current relay 1 is changed, the arc path is formed to extend to the central part C. In addition, in the above case, there is a concern that the arc paths A.P formed in the vicinity of each of the fixed contactors 22*a* and 22*b* extends toward each other to reduce arc extinguishing and discharging efficiency.

Accordingly, it is preferable that the polarities of the first and second Halbach arrays 220 and 230 and the magnet part 240 and the direction of the current are changed at the same time to correspond to each other.

In addition, in order to enhance the strength of each of the magnetic fields formed by the first and second Halbach arrays 220 and 230 and the magnet part 240, a magnet part (not shown) having polarities in the front-rear direction may be provided on the other surfaces of the magnet frame 210, that is, at least one of the third surface 213 and the fourth surface 214.

In the above case, the polarities of the provided magnet part (not shown) may be determined to correspond to the polarity of the second inner surfaces 222*a* and 232*a* respectively of the first and second Halbach arrays 220 and 230 and the polarity of the facing surface 241 of the magnet part 240.

That is, in the embodiment illustrated in FIG. 7A, the magnet part (not shown) provided on the third surface 213 or the fourth surface 214 is preferably magnetized such that a portion thereof in a direction facing the first and second Halbach arrays 220 and 230 is magnetized to an N pole and a portion thereof in a direction facing the magnet part 240 is magnetized to an S pole.

Similarly, in the embodiment illustrated in FIG. 7B, the magnet part (not shown) provided on the third surface 213 or the fourth surface 214 is preferably magnetized such that a portion thereof in a direction facing the first and second Halbach arrays 220 and 230 is magnetized to an S pole and a portion thereof in a direction facing the magnet part 240 is magnetized to an N pole.

In the above-described embodiment, the strength of the magnetic field formed inside the arc chamber 21 is enhanced, and the strength of the electromagnetic force is also enhanced accordingly, so that the arc path A.P can be more effectively formed.

Figure 8:
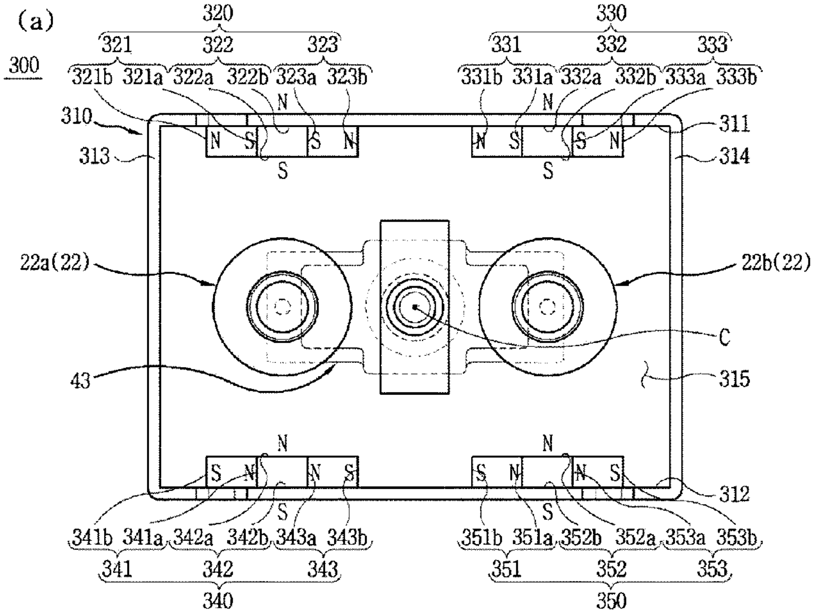
FIG. 8 is a conceptual view illustrating an arc path formation unit according to still another embodiment of the present disclosure and magnetic fields and arc paths formed by the arc path formation unit.
Figure 8:
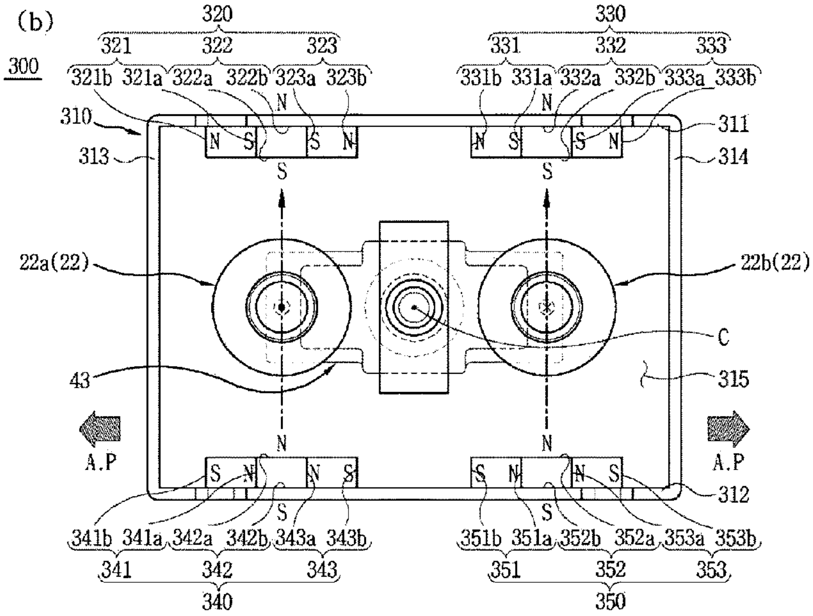

(3) Description of Arc Path Formation Unit 300 According Still Another Embodiment of Present Disclosure Hereinafter, an arc path formation unit 300 according to still another embodiment of the present disclosure will be described in detail with reference to FIG. 8.

Referring to FIG. 8A, the arc path formation unit 300 according to the illustrated embodiment includes a magnet frame 310, a first Halbach array 320, a second Halbach array 330, a third Halbach array 340, and a fourth Halbach array 350.

The magnet frame 310 according to the present embodiment has the same structure and function as the magnet frame 110 according to the above-described embodiment. However, there is a difference in the arrangement method of the first to fourth Halbach arrays 320, 330, 340, and 350 disposed in the magnet frame 310 according to the present embodiment.

Accordingly, a description of the magnet frame 310 will be replaced with the description of the magnet frame 110 according to the above-described embodiment.

In the illustrated embodiment, the plurality of magnetic materials constituting the first Halbach array 320 are continuously disposed side by side from the left side to the right side. That is, in the illustrated embodiment, the first Halbach array 320 is formed to extend in the left-right direction.

The first Halbach array 320 may form a magnetic field together with another magnetic material. In the illustrated embodiment, the first Halbach array 320 may form magnetic fields together with the second to fourth Halbach arrays 330, 340, and 350.

The first Halbach array 320 may be located adjacent to any one surface of first and second surfaces 311 and 312. In one embodiment, the first Halbach array 320 may be coupled to an inner side (i.e., the side in a direction toward a space part 315) of the any one surface.

In the illustrated embodiment, the first Halbach array 320 is disposed on an inner side of the first surface 311 and adjacent to the first surface 311 and faces the third Halbach array 340 located on an inner side of the second surface 312.

The space part 315, and the fixed contactor 22 and the movable contactor 43 accommodated in the space part 315 are located between the first Halbach array 320 and the third Halbach array 340. In the illustrated embodiment, the first fixed contactor 22*a* and the movable contactor 43 are located between the first Halbach array 320 and the third Halbach array 340.

The first Halbach array 320 may be disposed in parallel to the second Halbach array 330 in an extending direction thereof. In the illustrated embodiment, the first Halbach array 320 extends in the left-right direction and is disposed in parallel to the second Halbach array 330 in the left-right direction.

The first Halbach array 320 is located adjacent to the second Halbach array 330.

The first Halbach array 320 may be located to be biased to any one surface of a third surface 313 and a fourth surface 314. In the illustrated embodiment, the first Halbach array 320 is located to be biased to the third surface 313.

The first Halbach array 320 can enhance the strength of the magnetic field formed by itself and the magnetic fields formed together with the second to fourth Halbach arrays 330, 340, and 350. Since the process of enhancing the direction and magnetic field of the magnetic field formed by the first Halbach array 320 is a well-known technique, a detailed description thereof will be omitted.

In the illustrated embodiment, the first Halbach array 320 includes a first block 321, a second block 322, and a third block 323. It will be understood that the plurality of magnetic materials constituting the first Halbach array 320 are named as the blocks 321, 322, and 323, respectively.

The first to third blocks as the blocks 321, 322, and 323 may each be formed of a magnetic material. In one embodiment, the first to third blocks as the blocks 321, 322, and 323 may each be provided as a permanent magnet, an electromagnet, or the like.

The first to third blocks as the blocks 321, 322, and 323 may be disposed side by side in one direction. In the illustrated embodiment, the first to third blocks as the blocks 321, 322, and 323 are disposed side by side in a direction in which the first surface 311 extends, that is, in the left-right direction.

The first block 321 is located on the leftmost side. That is, the first block 321 is located adjacent to the third surface 313. In addition, the third block 323 is located on the rightmost side. That is, the third block 323 is located adjacent to the second Halbach array 330. In addition, the second block 322 is located between the first block 321 and the third block 323.

In one embodiment, the second block 322 may be in contact with each of the first and third blocks 321 and 323.

The second block 322 may be disposed to overlap the first fixed contactor 22*a* and a second block 342 of the third Halbach array 340 in a direction toward the third Halbach array 340 or the space part 315, i.e., in the front-rear direction in the illustrated embodiment.

Each of the blocks 321, 322, and 323 includes a plurality of surfaces.

Specifically, the first block 321 includes a first inner surface 321*a* facing the second block 322 and a first outer surface 321*b* opposite to the second block 322.

The second block 322 includes a second inner surface 322*a* facing the space part 315 or the third Halbach array 340, and a second outer surface 322*b* opposite to the space part 315 or the third Halbach array 340.

The third block 323 includes a third inner surface 323*a* facing the second block 322 and a third outer surface 323*b* opposite to the second block 322.

The plurality of surfaces of each of the blocks 321, 322, and 323 may be magnetized according to a predetermined rule to configure a Halbach array.

Specifically, the first to third inner surfaces 321*a*, 322*a*, and 323*a* may be magnetized to the same polarity. In addition, the first to third outer surfaces 321*b*, 322*b*, and 323*b* may be magnetized to a polarity different from the polarity of the first to third inner surfaces 321*a*, 322*a*, and 323*a*.

At this point, the first to third inner surfaces 321*a*, 322*a*, and 323*a* may be magnetized to the same polarity as first to third inner surfaces 331*a*, 332*a*, and 333*a* of the second Halbach array 330.

In addition, the first to third inner surfaces 331*a*, 332*a*, and 333*a* may be magnetized to a polarity different from that of first to third inner surfaces 341*a*, 342*a*, and 343*a* of the third Halbach array 340 and that of first to third inner surfaces 351*a*, 352*a*, and 353*a* of the fourth Halbach array 350.

Similarly, first to third outer surfaces 321*b*, 322*b*, and 323*b* may be magnetized to the same polarity as first to third outer surfaces 331*b*, 332*b*, and 333*b* of the second Halbach array 330.

In addition, the first to third outer surfaces 321*b*, 322*b*, and 323*b* may be magnetized to a polarity different from that of first to third outer surfaces 341*b*, 342*b*, and 343*b* of the third Halbach array 340 and that of first to third outer surfaces 351*b*, 352*b*, and 353*b* of the fourth Halbach array 350.

In the illustrated embodiment, the plurality of magnetic materials constituting the second Halbach array 330 are continuously disposed side by side from the left side to the right side. That is, in the illustrated embodiment, the second Halbach array 330 is formed to extend in the left-right direction.

The second Halbach array 330 may form a magnetic field together with another magnetic material. In the illustrated embodiment, the second Halbach array 330 may form magnetic fields together with the first, third and fourth Halbach arrays 320, 340, and 350.

The second Halbach array 330 may be located adjacent to any one surface of the first and second surfaces 311 and 312. In one embodiment, the second Halbach array 330 may be coupled to an inner side (i.e., the side in a direction toward the space part 315) of the any one surface.

In the illustrated embodiment, the second Halbach array 330 is disposed on the inner side of the first surface 311 and adjacent to the first surface 311 and faces the fourth Halbach array 350 located on the inner side of the second surface 312.

The space part 315, and the fixed contactor 22 and the movable contactor 43 accommodated in the space part 315 are located between the second Halbach array 330 and the fourth Halbach array 350. In the illustrated embodiment, the second fixed contactor 22*b* and the movable contactor 43 are located between the second Halbach array 330 and the fourth Halbach array 350.

The second Halbach array 330 may be disposed in parallel to the first Halbach array 320 in an extending direction thereof. In the illustrated embodiment, the second Halbach array 330 extends in the left-right direction and is disposed in parallel to the first Halbach array 320 in the left-right direction.

The second Halbach array 330 is located adjacent to the first Halbach array 320.

The second Halbach array 330 may be located to be biased to the other surface of the third surface 313 and the fourth surface 314. In the illustrated embodiment, the second Halbach array 330 is located to be biased to the fourth surface 314.

The second Halbach array 330 can enhance the strength of the magnetic field formed by itself and the strength of the magnetic fields formed together with first, third, and fourth Halbach arrays 320, 340, and 350. Since the process of enhancing the direction and magnetic field of the magnetic field formed by the second Halbach array 330 is a well-known technique, a detailed description thereof will be omitted.

In the illustrated embodiment, the second Halbach array 330 includes a first block 331, a second block 332, and a third block 333. It will be understood that the plurality of magnetic materials constituting the second Halbach array 330 are named as the blocks 331, 332, and 333, respectively.

The first to third blocks 331, 332, and 333 may each be formed of a magnetic material. In one embodiment, the first to third blocks 331, 332, and 333 may each be provided as a permanent magnet, an electromagnet, or the like.

The first to third blocks 331, 332, and 333 may be disposed side by side in one direction. In the illustrated embodiment, the first to third blocks 331, 332, and 333 are disposed side by side in a direction in which the first surface 311 extends, that is, in the left-right direction.

The first block 331 is located on the leftmost side. That is, the first block 331 is located adjacent to the first Halbach array 320. In addition, the third block 333 is located on the rightmost side. That is, the third block 333 is located adjacent to the fourth surface 314. The second block 332 is located between the first block 331 and the third block 333.

In one embodiment, the second block 332 may be in contact with each of the first and third blocks 331 and 333.

The second block 332 may be disposed to overlap the second fixed contactor 22*b* and the fourth Halbach array 350 in a direction toward the fourth Halbach array 350 or the space part 315, i.e., in the front-rear direction in the illustrated embodiment.

Each of the blocks 331, 332, and 333 includes a plurality of surfaces.

Specifically, the first block 331 includes the first inner surface 331*a* facing the second block 332 and the first outer surface 331*b* opposite to the second block 332.

The second block 332 includes the second inner surface 332*a* facing the space part 315 or the fourth Halbach array 350, and the second outer surface 332*b* opposite to the space part 315 or the fourth Halbach array 350.

The third block 333 includes the third inner surface 333*a* facing the second block 332 and the third outer surface 332*b* opposite to the second block 332.

The plurality of surfaces of each of the blocks 331, 332, and 333 may be magnetized according to a predetermined rule to configure a Halbach array.

Specifically, the first to third inner surfaces 331*a*, 332*a*, and 333*a* may be magnetized to the same polarity. In addition, the first to third outer surfaces 331*b*, 332*b*, and 333*b* may be magnetized to a polarity different from the polarity of the first to third inner surfaces 331*a*, 332*a*, and 333*a*.

At this point, the first to third inner surfaces 331*a*, 332*a*, and 333*a* may be magnetized to the same polarity as the first to third inner surfaces 321*a*, 322*a*, and 323*a* of the first Halbach array 320.

In addition, the first to third inner surfaces 331*a*, 332*a*, and 333*a* may be magnetized to a polarity different from that of the first to third inner surfaces 341*a*, 342*a*, and 343*a* of the third Halbach array 340 and the first to third inner surfaces 351*a*, 352*a*, and 353*a* of the fourth Halbach array 350.

Similarly, the first to third outer surfaces 331*b*, 332*b*, and 333*b* may be magnetized to the same polarity as the first to third outer surfaces 321*b*, 322*b*, and 323*b* of the first Halbach array 320.

In addition, the first to third outer surfaces 331*b*, 332*b*, and 333*b* may be magnetized to a polarity different from that of the first to third outer surfaces 341*b*, 342*b*, and 343*b* of the third Halbach array 340 and the first to third outer surfaces 351*b*, 352*b*, and 353*b* of the fourth Halbach array 350.

In the illustrated embodiment, the plurality of magnetic materials constituting the third Halbach array 340 are continuously disposed side by side from the left side to the right side. That is, in the illustrated embodiment, the third Halbach array 340 is formed to extend in the left-right direction.

The third Halbach array 340 may form a magnetic field together with another magnetic material. In the illustrated embodiment, the third Halbach array 340 may form magnetic fields together with the first, second and fourth Halbach arrays 320, 330, and 350.

The third Halbach array 340 may be located adjacent to the other surface of the first and second surfaces 311 and 312. In one embodiment, the third Halbach array 340 may be coupled to an inner side (i.e., the side in a direction toward the space part 315) of the other surface.

In the illustrated embodiment, the third Halbach array 340 is disposed on the inner side of the second surface 312 and adjacent to the second surface 312 and faces the first Halbach array 320 located on the inner side of the first surface 311.

The space part 315, and the fixed contactor 22 and the movable contactor 43 accommodated in the space part 315 are located between the third Halbach array 340 and the first Halbach array 320. In the illustrated embodiment, the first fixed contactor 22*a* and the movable contactor 43 are located between the third Halbach array 340 and the first Halbach array 320.

The third Halbach array 340 may be disposed in parallel to the fourth Halbach array 350 in an extending direction thereof. In the illustrated embodiment, the third Halbach array 340 extends in the left-right direction and is disposed in parallel to the fourth Halbach array 350 in the left-right direction.

The third Halbach array 340 is located adjacent to the fourth Halbach array 350.

The third Halbach array 340 may be located to be biased to any one surface of the third surface 313 and the fourth surface 314. In the illustrated embodiment, the third Halbach array 340 is located to be biased to the third surface 313.

The third Halbach array 340 can enhance the strength of the magnetic field formed by itself and the strength of the magnetic fields formed together with first, second, and fourth Halbach arrays 320, 330, and 350. Since the process of enhancing the direction and magnetic field of the magnetic field formed by the third Halbach array 340 is a well-known technique, a detailed description thereof will be omitted.

In the illustrated embodiment, the third Halbach array 340 includes a first block 341, the second block 342, and a third block 343. It will be understood that the plurality of magnetic materials constituting the third Halbach array 340 are named as the blocks 341, 342, and 343, respectively.

The first to third blocks 341, 342, and 343 may each be formed of a magnetic material. In one embodiment, the first to third blocks 341, 342, and 343 may each be provided as a permanent magnet, an electromagnet, or the like.

The first to third blocks 341, 342, and 343 may be disposed side by side in one direction. In the illustrated embodiment, the first to third blocks 341, 342, and 343 are disposed side by side in a direction in which the second surface 312 extends, that is, in the left-right direction.

The first block 341 is located on the leftmost side. That is, the first block 341 is located adjacent to the third surface 313. In addition, the third block 343 is located on the rightmost side. That is, the third block 343 is located adjacent to the fourth Halbach array 350. The second block 342 is located between the first block 341 and the third block 343.

In one embodiment, the second block 342 may be in contact with each of the first and third blocks 341 and 343.

The second block 342 may be disposed to overlap the first fixed contactor 22*a* and the second block 322 of the first Halbach array 320 in a direction toward the first Halbach array 320 or the space part 315, i.e., in the front-rear direction in the illustrated embodiment.

Each of the blocks 341, 342, and 343 includes a plurality of surfaces.

Specifically, the first block 341 includes the first inner surface 341*a* facing the second block 342 and the first outer surface 341*b* opposite to the second block 342.

The second block 342 includes the second inner surface 342*a* facing the space part 315 or the first Halbach array 320, and the second outer surface 342*b* opposite to the space part 315 or the first Halbach array 320.

The third block 343 includes the third inner surface 343*a* facing the second block 342 and the third outer surface 343*b* opposite to the second block 342.

The plurality of surfaces of each of the blocks 341, 342, and 343 may be magnetized according to a predetermined rule to configure a Halbach array.

Specifically, the first to third inner surfaces 341*a*, 342*a*, and 343*a* may be magnetized to the same polarity. In addition, the first to third outer surfaces 341*b*, 342*b*, and 343*b* may be magnetized to a polarity different from the polarity of the first to third inner surfaces 341*a*, 342*a*, and 343*a*.

At this point, the first to third inner surfaces 341*a*, 342*a*, and 343*a* may be magnetized to the same polarity as the first to third inner surfaces 351*a*, 352*a*, and 353*a* of the fourth Halbach array 350.

In addition, the first to third inner surfaces 341*a*, 342*a*, and 343*a* may be magnetized to a polarity different from that of the first to third inner surfaces 321*a*, 322*a*, and 323*a* of the first Halbach array 320 and the first to third inner surfaces 331*a*, 332*a*, and 333*a* of the second Halbach array 330.

Similarly, the first to third outer surfaces 341*b*, 342*b*, and 343*b* may be magnetized to the same polarity as the first to third outer surfaces 351*b*, 352*b*, and 353*b* of the fourth Halbach array 350.

In addition, the first to third outer surfaces 341*b*, 342*b*, and 343*b* may be magnetized to a polarity different from that of the first to third outer surfaces 321*b*, 322*b*, and 323*b* of the first Halbach array 320 and the first to third outer surfaces 331*b*, 332*b*, and 333*b* of the second Halbach array 330.

In the illustrated embodiment, the plurality of magnetic materials constituting the fourth Halbach array 350 are continuously disposed side by side from the left side to the right side. That is, in the illustrated embodiment, the fourth Halbach array 350 is formed to extend in the left-right direction.

The fourth Halbach array 350 may form a magnetic field together with another magnetic material. In the illustrated embodiment, the fourth Halbach array 350 may form magnetic fields together with the first to third Halbach arrays 320, 330, and 340.

The fourth Halbach array 350 may be located adjacent to the other surface of the first and second surfaces 311 and 312. In one embodiment, the fourth Halbach array 350 may be coupled to an inner side (i.e., the side in a direction toward the space part 315) of the other surface.

In the illustrated embodiment, the fourth Halbach array 350 is disposed on the inner side of the second surface 312 and adjacent to the second surface 312 and faces the second Halbach array 330 located on the inner side of the first surface 311.

The space part 315, and the fixed contactor 22 and the movable contactor 43 accommodated in the space part 315 are located between the fourth Halbach array 350 and the second Halbach array 330. In the illustrated embodiment, the second fixed contactor 22*b* and the movable contactor 43 are located between the fourth Halbach array 350 and the second Halbach array 330.

The fourth Halbach array 350 may be disposed in parallel to the third Halbach array 340 in an extending direction thereof. In the illustrated embodiment, the fourth Halbach array 350 extends in the left-right direction and is disposed in parallel to the third Halbach array 340 in the left-right direction.

The fourth Halbach array 350 is located adjacent to the third Halbach array 340.

The fourth Halbach array 350 may be located to be biased to the other surface of the third surface 313 and the fourth surface 314. In the illustrated embodiment, the fourth Halbach array 350 is located to be biased to the fourth surface 314.

The fourth Halbach array 350 can enhance the strength of the magnetic field formed by itself and the strength of the magnetic fields formed together with the first to third Halbach arrays 320, 330, and 340. Since the process of enhancing the direction and magnetic field of the magnetic field formed by the fourth Halbach array 350 is a well-known technique, a detailed description thereof will be omitted.

In the illustrated embodiment, the fourth Halbach array 350 includes a first block 351, a second block 352, and a third block 353. It will be understood that the plurality of magnetic materials constituting the fourth Halbach array 350 are named as the blocks 351, 352, and 353, respectively.

The first to third blocks 351, 352, and 353 may each be formed of a magnetic material. In one embodiment, the first to third blocks 351, 352, and 353 may each be provided as a permanent magnet, an electromagnet, or the like.

The first to third blocks 351, 352, and 353 may be disposed side by side in one direction. In the illustrated embodiment, the first to third blocks 351, 352, and 353 are disposed side by side in a direction in which the second surface 312 extends, that is, in the left-right direction.

The first block 351 is located on the leftmost side. That is, the first block 351 is located adjacent to the third Halbach array 340. In addition, the third block 353 is located on the rightmost side. That is, the third block 353 is located adjacent to the third Halbach array 340. The second block 352 is located between the first block 351 and the third block 353.

In one embodiment, the second block 352 may be in contact with each of the first and third blocks 351 and 353.

The second block 352 may be disposed to overlap the second fixed contactor 22*b* and the second Halbach array 330 in a direction toward the second Halbach array 330 or the space part 315, i.e., in the front-rear direction in the illustrated embodiment.

Each of the blocks 351, 352, and 353 includes a plurality of surfaces.

Specifically, the first block 351 includes the first inner surface 351*a* facing the second block 352 and the first outer surface 351*b* opposite to the second block 352.

The second block 352 includes the second inner surface 352*a* facing the space part 315 or the second Halbach array 330, and the second outer surface 352*b* opposite to the space part 315 or the second Halbach array 330.

The third block 353 includes the third inner surface 353*a* facing the second block 352 and the third outer surface 353*b* opposite to the second block 352.

The plurality of surfaces of each of the blocks 351, 352, and 353 may be magnetized according to a predetermined rule to configure a Halbach array.

Specifically, the first to third inner surfaces 351*a*, 352*a*, and 353*a* may be magnetized to the same polarity. In addition, the first to third outer surfaces 351*b*, 352*b*, and 353*b* may be magnetized to a polarity different from the polarity of the first to third inner surfaces 351*a*, 352*a*, and 353*a*.

At this point, the first to third inner surfaces 351*a*, 352*a*, and 353*a* may be magnetized to the same polarity as the first to third inner surfaces 341*a*, 342*a*, and 343*a* of the third Halbach array 340.

In addition, the first to third inner surfaces 351*a*, 352*a*, and 353*a* may be magnetized to a polarity different from that of the first to third inner surfaces 321*a*, 322*a*, and 323*a* of the first Halbach array 320 and the first to third inner surfaces 331*a*, 332*a*, and 333*a* of the second Halbach array 330.

Similarly, the first to third outer surfaces 351*b*, 352*b*, and 353*b* may be magnetized to the same polarity as the first to third outer surfaces 341*b*, 342*b*, and 343*b* of the third Halbach array 340.

In addition, the first to third outer surfaces 351*b*, 352*b*, and 353*b* may be magnetized to a polarity different from that of the first to third outer surfaces 321*b*, 322*b*, and 323*b* of the first Halbach array 320 and the first to third outer surfaces 331*b*, 332*b*, and 333*b* of the second Halbach array 330.

Hereinafter, an arc path A.P formed by the arc path formation unit 300 according to the present embodiment will be described in detail with reference to FIG. 8B Referring to b of FIG. 8B, the first to third inner surfaces 321*a*, 322*a*, and 333*a* of the first Halbach array 320 are magnetized to S poles. In addition, by the above-described rule, the first to third inner surfaces 331*a*, 332*a*, and 333*a* of the second Halbach array 330 are also magnetized to S poles.

At this point, by the above-described rule, the first to third inner surfaces 341*a*, 342*a*, and 343*a* of the third Halbach array 340 and the first to third inner surfaces 351*a*, 352*a*, and 353*a* of the fourth Halbach array 350 are magnetized to N poles which are polarities opposite to the polarities of the first to third inner surfaces 321*a*, 322*a*, and 333*a* of the first Halbach array 320.

Accordingly, a magnetic field in a direction from the second inner surface 342*a* toward the second inner surface 322*a* is formed between the first Halbach array 320 and the third Halbach array 340.

In addition, a magnetic field in a direction from the second inner surface 352*a* toward the second inner surface 332*a* is formed between the second Halbach array 330 and the fourth Halbach array 350.

In the embodiment illustrated in FIG. 8B, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the left side.

Accordingly, an arc path A.P in the vicinity of the first fixed contactor 22*a* is also formed toward the left side.

Similarly, when the Fleming's left-hand rule is applied to the second fixed contactor 22*b*, an electromagnetic force generated in the vicinity of the second fixed contactor 22*b* is formed toward the right side.

Accordingly, an arc path A.P in the vicinity of the second fixed contactor 22*b* is also formed toward the right side.

As a result, the arc paths A.P formed in the vicinity of each of the fixed contactors 22*a* and 22*b* are formed in opposite directions and thus do not meet each other.

Accordingly, in the arc path formation unit 300 according to the present embodiment, the strength of each of the magnetic field formed inside the arc chamber 21 and the electromagnetic force formed by the magnetic field can be enhanced by the first to fourth Halbach arrays 320, 330, 340, and 350.

The direction of the electromagnetic force formed by the arc path formation unit 300 induces arcs generated by the fixed contactors 22*a* and 22*b* in opposite directions.

Accordingly, damage to each component of the direct current relay 1 disposed adjacent to the central part C can be prevented. Furthermore, since the generated arc can be quickly discharged to the outside, operational reliability of the direct current relay 1 can be improved.

In addition, in the case of the arc path formation unit 300 according to the present embodiment, it will be understood that the polarities of the first to fourth Halbach arrays 320, 330, 340, and 350 and the direction of the current flowing through the direct current relay 1 should be changed simultaneously.

That is, when only one of the polarities of the first to fourth Halbach arrays 320, 330, 340, and 350 and the direction of the current flowing through the direct current relay 1 is changed, the arc path may be formed toward the central part C.

In addition, in order to enhance the strength of each of the magnetic fields formed by the first to fourth Halbach arrays 320, 330, 340, and 350, a magnet part (not shown) having polarities in the front-rear direction may be provided on the other surfaces of the magnet frame 310, that is, at least one of the third surface 313 and the fourth surface 314.

In the above case, the polarities of the provided magnet part (not shown) may be determined to correspond to the polarities of the second inner surfaces 322*a*, 332*a*, 342*a*, and 352*a* respectively of the first and fourth Halbach arrays 320, 330, 340, and 350.

That is, in the embodiment illustrated in FIG. 8B, the magnet part (not shown) provided on the third surface 313 or the fourth surface 314 is preferably magnetized such that a portion thereof in a direction facing the first and second Halbach arrays 320 and 330 is magnetized to an S pole and a portion thereof in a direction facing the third and fourth Halbach arrays 340 and 350 is magnetized to an S pole.

In the above-described embodiment, the strength of the magnetic field formed inside the arc chamber 21 is enhanced, and the strength of the electromagnetic force is also enhanced accordingly, so that the arc path A.P can be more effectively formed.

Although it has been described above with reference to preferred embodiments of the present disclosure, it will be understood that those skilled in the art are able to variously modify and change the present disclosure without departing from the spirit and scope of the disclosure described in the claims below.

1: direct current relay
10: frame part
11: upper frame
12: lower frame
13: insulating plate
14: supporting plate
20: opening/closing part
21: arc chamber
22: fixed contactor
22*a*: first fixed contactor
22*b*: second fixed contactor
23: sealing member
30: core part
31: fixed core
32: movable core
33: yoke
34: bobbin
35: coil
36: return spring
37: cylinder
40: movable contactor part
41: housing
42: cover
43: movable contactor
44: shaft
45: elastic part
100: arc path formation unit according to one embodiment of present disclosure
110: magnet frame
111: first surface
112: second surface
113: third surface
114: fourth surface
115: space part
120: first Halbach array
121: first block
121*a*: first inner surface
121*b*: first outer surface
122: second block
122*a*: second inner surface
122*b*: second outer surface
123: Third block
123*a*: third inner surface
123*b*: third outer surface
130: second Halbach array
131: first block
131*a*: first inner surface
131*b*: first outer surface
132: second block
132*a*: second inner surface
132*b*: second outer surface
133: Third block
133*a*: third inner surface
133*b*: third outer surface
200: arc path formation unit according to another embodiment of present disclosure
210: magnet frame
211: first surface
212: second surface
213: third surface
214: fourth surface
215: space part
220: first Halbach array
221: first block
221*a*: first inner surface
221*b*: first outer surface
222: second block
222*a*: second inner surface
222*b*: second outer surface
223: third block
223*a*: third inner surface
223*b*: third outer surface
230: second Halbach array
231: first block
231*a*: first inner surface
231*b*: first outer surface
232: second block
232*a*: second inner surface
232*b*: second outer surface
233: third block
233*a*: third inner surface
233*b*: third outer surface
240: magnet part
241: facing surface
242: opposing surface
300: arc path formation unit according still another embodiment of present disclosure
310: magnet frame
311: first surface
312: second surface
313: third surface
314: fourth surface
315: space part
320: first Halbach array
321: first block
321*a*: first inner surface
321*b*: first outer surface
322: Second block
322*a*: second inner surface
322*b*: second outer surface
323: third block
323*a*: third inner surface
323*b*: third outer surface
330: second Halbach array
331: first block

331*a*: first inner surface
331*b*: first outer surface
332: second block
332*a*: second inner surface
332*b*: second outer surface
333: third block
333*a*: third inner surface
333*b*: third outer surface
340: third Halbach array
341: first block
341*a*: first inner surface
341*b*: first outer surface
342: second block
342*a*: second inner surface
342*b*: second outer surface
343: third block
343*a*: third inner surface
343*b*: third outer surface
350: fourth Halbach array
351: first block
351*a*: first inner surface
351*b*: first outer surface
352: second block
352*a*: second inner surface
352*b*: second outer surface
353: third block
353*a*: third inner surface
353*b*: third outer surface
1000: direct current relay according to related art
1100: fixed contact according to related art
1200: movable contact according to related art
1300: permanent magnet according to related art
1310: first permanent magnet according to related art
1320: second permanent magnet according to related art
C: central part of space part 115, 215, or 315
A.P: arc path

The invention claimed is:

1. An arc path formation unit comprising:

a magnet frame having a space part, in which a fixed contactor and a movable contactor are accommodated, formed therein; and a Halbach array located in the space part of the magnet frame and configured to form a magnetic field in the space part, wherein a length of the space part in one direction is formed to be greater than a length thereof in the other direction, the magnet frame includes:

a first surface and a second surface which extend in the one direction, are disposed to face each other, and are configured to surround a portion of the space part; and a third surface and a fourth surface which extend in the other direction, are continuous with the first surface and the second surface, respectively, are disposed to face each other, and are configured to surround a remaining portion of the space part, and the Halbach array includes a plurality of blocks disposed side by side in the one direction and in physical contact with at least one other block of the plurality of blocks and formed of a magnetic material, and is located adjacent to one or more surfaces of the first surface and the second surface.

2. The arc path formation unit of claim 1, wherein the Halbach array includes:

a first Halbach array located adjacent to any one surface of the first surface and the second surface; and a second Halbach array located adjacent to the other surface of the first surface and the second surface and disposed to face the first Halbach array with the space part therebetween.

3. The arc path formation unit of claim 2, wherein a surface of the first Halbach array facing the second Halbach array and a surface of the second Halbach array facing the first Halbach array are magnetized to different polarities.

4. The arc path formation unit of claim 2, wherein the first Halbach array includes:

a first block located to be biased to any one surface of the third surface and the fourth surface;

a third block located to be biased to the other surface of the third surface and the fourth surface; and a second block located between the first block and the third block, and the second Halbach array includes:

a first block located to be biased to any one surface of the third surface and the fourth surface;

a third block located to be biased to the other surface of the third surface and the fourth surface; and a second block located between the first block and the third block.

5. The arc path formation unit of claim 4, wherein in the first Halbach array, a surface of the first block facing the second block, a surface of the third block facing the second block, and a surface of the second block facing the second Halbach array are magnetized to the same polarity, and in the second Halbach array, a surface of the first block facing the second block, a surface of the third block facing the second block, and a surface of the second block facing the first Halbach array are magnetized to a polarity different from the polarity.

6. The arc path formation unit of claim 1, wherein the Halbach array includes:

a first Halbach array located adjacent to any one surface of the first surface and the second surface, and located to be biased to any one surface of the third surface and the fourth surface; and a second Halbach array located adjacent to the any one surface of the first surface and the second surface, and located to be biased to the other surface of the third surface and the fourth surface, and a magnet part, which is provided separately from the Halbach array, disposed to face each of the first and second Halbach arrays with the space part therebetween, and configured to form the magnetic field in the space part, is provided on the other surface of the first surface and the second surface.

7. The arc path formation unit of claim 6, wherein a surface of the first Halbach array facing the magnet part and a surface of the second Halbach array facing the magnet part are magnetized to the same polarity, and a surface of the magnet part facing the first Halbach array and the second Halbach array is magnetized to a polarity different from the polarity.

8. The arc path formation unit of claim 6, wherein the first Halbach array includes:

a first block located to be biased to the any one surface of the third surface and the fourth surface;

a third block located to be biased to the other surface of the third surface and the fourth surface; and a second block located between the first block and the third block, and the second Halbach array includes:

a first block located to be biased to the any one surface of the third surface and the fourth surface;

a third block located to be biased to the other surface of the third surface and the fourth surface; and a second block located between the first block and the third block.

9. The arc path formation unit of claim 8, wherein in the first Halbach array, a surface of the first block facing the second block, a surface of the third block facing the second block, and a surface of the second block facing the magnet part are magnetized to the same polarity, in the second Halbach array, a surface of the first block facing the second block, a surface of the third block facing the second block, and a surface of the second block facing the magnet part are magnetized to the same polarity, and in the magnet part, a surface of the magnet part facing the first Halbach array and the second Halbach array is magnetized to a polarity different from the polarity.

10. The arc path formation unit of claim 1, wherein the Halbach array includes:

a first Halbach array located adjacent to any one surface of the first surface and the second surface, and located to be biased to any one surface of the third surface and the fourth surface;

a second Halbach array located adjacent to the any one surface of the first surface and the second surface, and located to be biased to the other surface of the third surface and the fourth surface;

a third Halbach array located adjacent to the other surface of the first surface and the second surface, located to be biased to the any one surface of the third surface and the fourth surface, and disposed to face the first Halbach array with the space part therebetween; and a fourth Halbach array located adjacent to the other surface of the first surface and the second surface, located to be biased to the other surface of the third surface and the fourth surface, and disposed to face the second Halbach array with the space part therebetween.

11. The arc path formation unit of claim 10, wherein a surface of the first Halbach array facing the third Halbach array and a surface of the second Halbach array facing the fourth Halbach array are magnetized to the same polarity, and a surface of the third Halbach array facing the first Halbach array and a surface of the fourth Halbach array facing the second Halbach array are magnetized to a polarity different from the polarity.

12. The arc path formation unit of claim 10, wherein the first Halbach array includes:

a first block located to be biased to the any one surface of the third surface and the fourth surface;

a third block located to be biased to the other surface of the third surface and the fourth surface; and a second block located between the first block and the third block, the second Halbach array includes:

a first block located to be biased to the any one surface of the third surface and the fourth surface;

a third block located to be biased to the other surface of the third surface and the fourth surface; and a second block located between the first block and the third block, the third Halbach array includes:

a first block located to be biased to the any one surface of the third surface and the fourth surface;

a third block located to be biased to the other surface of the third surface and the fourth surface; and a second block located between the first block and the third block, and the fourth Halbach array includes:

a first block located to be biased to the any one surface of the third surface and the fourth surface;

a third block located to be biased to the other surface of the third surface and the fourth surface; and a second block located between the first block and the third block.

13. The arc path formation unit of claim 12, wherein in each of the first Halbach array and the second Halbach array, a surface of the first block facing the second block, a surface of the third block facing the second block, and a surface of the second block facing the third Halbach array and the fourth Halbach array are magnetized to the same polarity, and in each of the third Halbach array and the fourth Halbach array, a surface of the first block facing the second block, a surface of the third block facing the second block, and a surface of the second block facing the first Halbach array and the second Halbach array are magnetized to a polarity different from the polarity.

14. A direct current relay comprising:

a plurality of fixed contactors located to be spaced apart from each other in one direction;

a movable contactor configured to be brought into contact with or separated from the fixed contactors;

a magnet frame having a space part, in which the fixed contactors and the movable contactor are accommodated, formed therein; and a Halbach array located in the space part of the magnet frame and configured to form a magnetic field in the space part, wherein a length of the space part in the one direction is formed to be greater than a length thereof in the other direction, the magnet frame includes:

a first surface and a second surface which extend in the one direction, are disposed to face each other, and are configured to surround a portion of the space part; and a third surface and a fourth surface which extend in the other direction, are continuous with the first surface and the second surface, respectively, are disposed to face each other, and are configured to surround a remaining portion of the space part, and the Halbach array includes a plurality of blocks disposed side by side in the one direction and in physical contact with at least one other block of the plurality of blocks and formed of a magnetic material, and is located adjacent to one or more surfaces of the first surface and the second surface.

15. The direct current relay of claim 14, wherein the Halbach array includes:

a first Halbach array located adjacent to any one surface of the first surface and the second surface; and a second Halbach array located adjacent to the other surface of the first surface and the second surface and disposed to face the first Halbach array with the space part therebetween, wherein a surface of the first Halbach array facing the second Halbach array and a surface of the second Halbach array facing the first Halbach array are magnetized to different polarities.

16. The direct current relay of claim 14, wherein the Halbach array includes:

a first Halbach array located adjacent to any one surface of the first surface and the second surface, and located to be biased to any one surface of the third surface and the fourth surface; and a second Halbach array located adjacent to the any one surface of the first surface and the second surface, and located to be biased to the other surface of the third surface and the fourth surface, and a magnet part, which is provided separately from the Halbach array, disposed to face each of the first and second Halbach arrays with the space part therebetween, and configured to form the magnetic field in the space part, is provided on the other surface of the first surface and the second surface, wherein a surface of the first Halbach array facing the magnet part and a surface of the second Halbach array facing the magnet part are magnetized to the same polarity, and a surface of the magnet part facing the first Halbach array and the second Halbach array is magnetized to a polarity different from the polarity.

17. The direct current relay of claim 14, wherein the Halbach array includes:

a first Halbach array located adjacent to any one surface of the first surface and the second surface, and located to be biased to any one surface of the third surface and the fourth surface;

a second Halbach array located adjacent to the any one surface of the first surface and the second surface, and located to be biased to the other surface of the third surface and the fourth surface;

a third Halbach array located adjacent to the other surface of the first surface and the second surface, located to be biased to the any one surface of the third surface and the fourth surface, and disposed to face the first Halbach array with the space part therebetween; and a fourth Halbach array located adjacent to the other surface of the first surface and the second surface, located to be biased to the other surface of the third surface and the fourth surface, and disposed to face the second Halbach array with the space part therebetween, wherein a surface of the first Halbach array facing the third Halbach array and a surface of the second Halbach array facing the fourth Halbach array are magnetized to the same polarity, and a surface of the third Halbach array facing the first Halbach array and a surface of the fourth Halbach array facing the second Halbach array are magnetized to a polarity different from the polarity.

* * * * *